(12) United States Patent
Charnell et al.

(10) Patent No.: US 7,069,549 B2
(45) Date of Patent: Jun. 27, 2006

(54) MULTI-THREADED FRAGMENT PATCHING

(75) Inventors: William Thomas Charnell, Great Missenden (GB); Wayne Plummer, High Wycombe (GB); Stephen Darnell, Maidenhead (GB); Blaise Abel Alec Dias, Uxbridge (GB); Philippa Joy Guthrie, Aylesbury (GB); Jeremy Paul Kramskoy, Long Kitton (GB); Jeremy James Sexton, Hemel Hempstead (GB); Michael John Wynn, Maidenhead (GB); Keith Rautenbach, High Wycombe (GB); Stephen Paul Thomas, High Wycombe (GB)

(73) Assignee: Esmertec AG, Dubendorf (CH)

( * ) Notice: Subject to any disclaimer, the term of this patent is extended or adjusted under 35 U.S.C. 154(b) by 269 days.

(21) Appl. No.: 09/858,578

(22) Filed: May 16, 2001

(65) Prior Publication Data
US 2002/0104077 A1 Aug. 1, 2002

Related U.S. Application Data

(63) Continuation of application No. PCT/GB99/00788, filed on Mar. 16, 1999.

(30) Foreign Application Priority Data
Nov. 16, 1998 (GB) .................................... 9825102

(51) Int. Cl.
G06F 9/45 (2006.01)
(52) U.S. Cl. ...................... 717/158; 717/141; 717/162; 712/226; 712/233

(58) Field of Classification Search ................ 717/148, 717/168–178, 162–167, 159, 136, 139, 141, 717/151, 152, 157, 158; 711/118, 153, 170, 711/213; 712/220, 226, 233, 234, 244
See application file for complete search history.

(56) References Cited

U.S. PATENT DOCUMENTS

| | | | |
|---|---|---|---|
| 4,675,829 A | 6/1987 | Clemenson | |
| 4,924,408 A | 5/1990 | Highland | |
| 5,210,876 A | 5/1993 | Uchida | |
| 5,301,260 A | 4/1994 | Miyashita | |

(Continued)

OTHER PUBLICATIONS

Lindholm-Yellin, The Java Virtual Machine Specification, Sep. 1996, Addison-Wesley, pp. 66-68.*

(Continued)

*Primary Examiner*—Antony Nguyen-Ba
(74) *Attorney, Agent, or Firm*—Caesar, Rivise, Bernstein, Cohen & Pokotilow, Ltd.

(57) ABSTRACT

A method and system multi-threaded fragment patching. The method provides a link in a self-modifying multi-threaded computer system between a first and a second piece of compiled code where the first piece of compiled code includes a control transfer instruction to the second piece of compiled code. The link is formed by inserting a patch from the first piece of compiled code to the second piece of compiled code. The patch may be a direct reference or a reference to an outlier.

11 Claims, 27 Drawing Sheets

U.S. PATENT DOCUMENTS

| | | | |
|---|---|---|---|
| 5,301,325 A | 4/1994 | Benson | |
| 5,339,436 A | 8/1994 | Tairaku et al. | |
| 5,367,685 A | 11/1994 | Gosling | |
| 5,442,792 A | 8/1995 | Chun | |
| 5,450,575 A | 9/1995 | Sites | |
| 5,452,457 A | 9/1995 | Alpert et al. | |
| 5,469,574 A | 11/1995 | Chang et al. | |
| 5,493,674 A * | 2/1996 | Mizutani et al. | 714/6 |
| 5,530,964 A | 6/1996 | Alpert et al. | |
| 5,551,040 A | 8/1996 | Blewett | |
| 5,590,332 A | 12/1996 | Baker | |
| 5,598,561 A | 1/1997 | Funaki | |
| 5,603,030 A | 2/1997 | Gray et al. | |
| 5,613,120 A | 3/1997 | Palay et al. | |
| 5,619,698 A * | 4/1997 | Lillich et al. | 717/168 |
| 5,655,122 A | 8/1997 | Wu | |
| 5,675,804 A | 10/1997 | Sidik et al. | |
| 5,721,854 A | 2/1998 | Ebcioglu et al. | |
| 5,732,273 A * | 3/1998 | Srivastava et al. | 717/128 |
| 5,748,961 A * | 5/1998 | Hanna et al. | 717/145 |
| 5,757,690 A * | 5/1998 | McMahon | 365/104 |
| 5,761,513 A | 6/1998 | Yellin et al. | |
| 5,764,989 A | 6/1998 | Gustafsson et al. | |
| 5,805,899 A * | 9/1998 | Evans et al. | 717/170 |
| 5,815,720 A | 9/1998 | Buzbee | |
| 5,822,787 A * | 10/1998 | Zucker | 711/213 |
| 5,835,771 A | 11/1998 | Veldhuizen | |
| 5,848,274 A | 12/1998 | Hamby et al. | |
| 5,857,104 A | 1/1999 | Natarjan et al. | |
| 5,872,962 A * | 2/1999 | Hisanaga et al. | 712/230 |
| 5,872,978 A | 2/1999 | Hoskins | |
| 5,873,104 A | 2/1999 | Tremblay et al. | |
| 6,044,403 A * | 3/2000 | Gerszberg et al. | 709/225 |
| 6,108,797 A * | 8/2000 | Lin et al. | 714/8 |
| 6,141,768 A * | 10/2000 | Lin et al. | 714/8 |
| 6,324,686 B1 * | 11/2001 | Komatsu et al. | 717/148 |
| 6,327,704 B1 * | 12/2001 | Mattson et al. | 717/153 |
| 6,412,081 B1 * | 6/2002 | Koscal et al. | 714/34 |
| 6,499,137 B1 * | 12/2002 | Hunt | 717/164 |

OTHER PUBLICATIONS

JAVA WORLD—Di Giorgio—Jul. 1997—Use native methods to expand the Java environment.

Karaorman, M. et al.—jContractor: a reflective Java library to support design by contract-V 1616, Jul. 19-21, 1999, pp. 175-196,Saint-Malo, Fr.

Java Native Interface Specification—Java Native Interface Specification Release May 16, 1997, Sun Microsystems, Inc., California.

Dyadkin, L.J.—Multibox Parsers—ACM Sigplan Notices, Association for Computing Machinery, New York, vol. 29, No. 7, Jul. 1, 1994, p. 54-60.

* cited by examiner

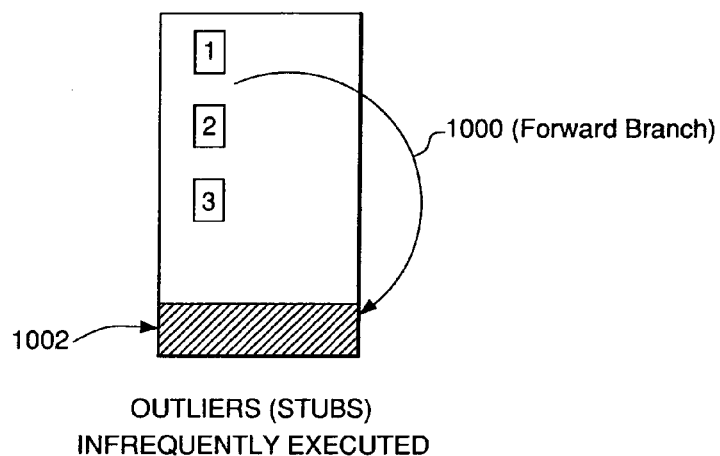
FIG. A1-1
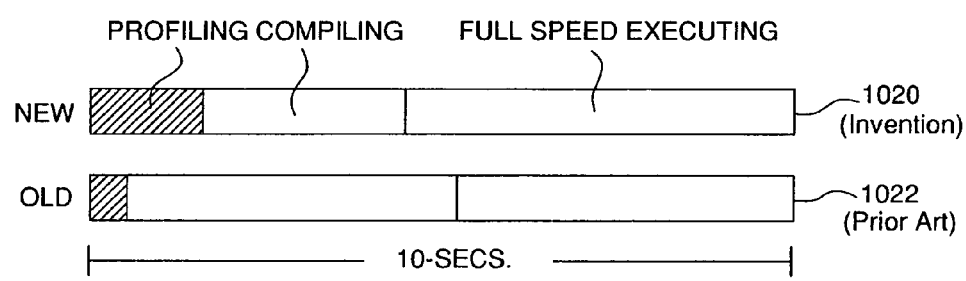
FIG. A1-2

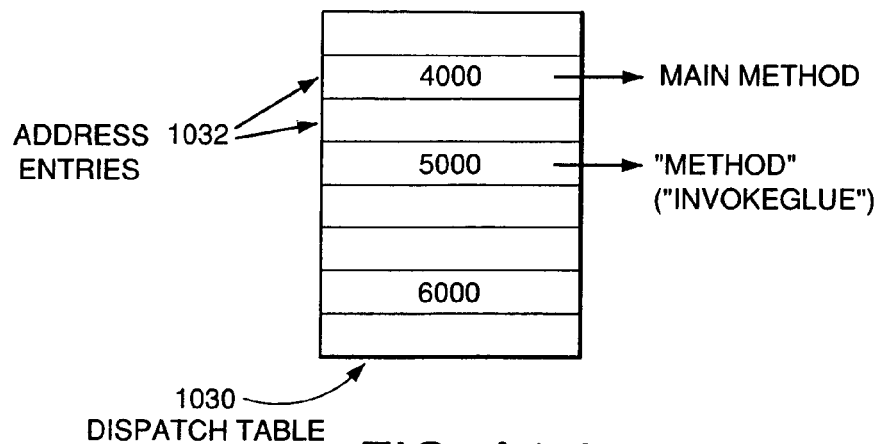
FIG. A1-3
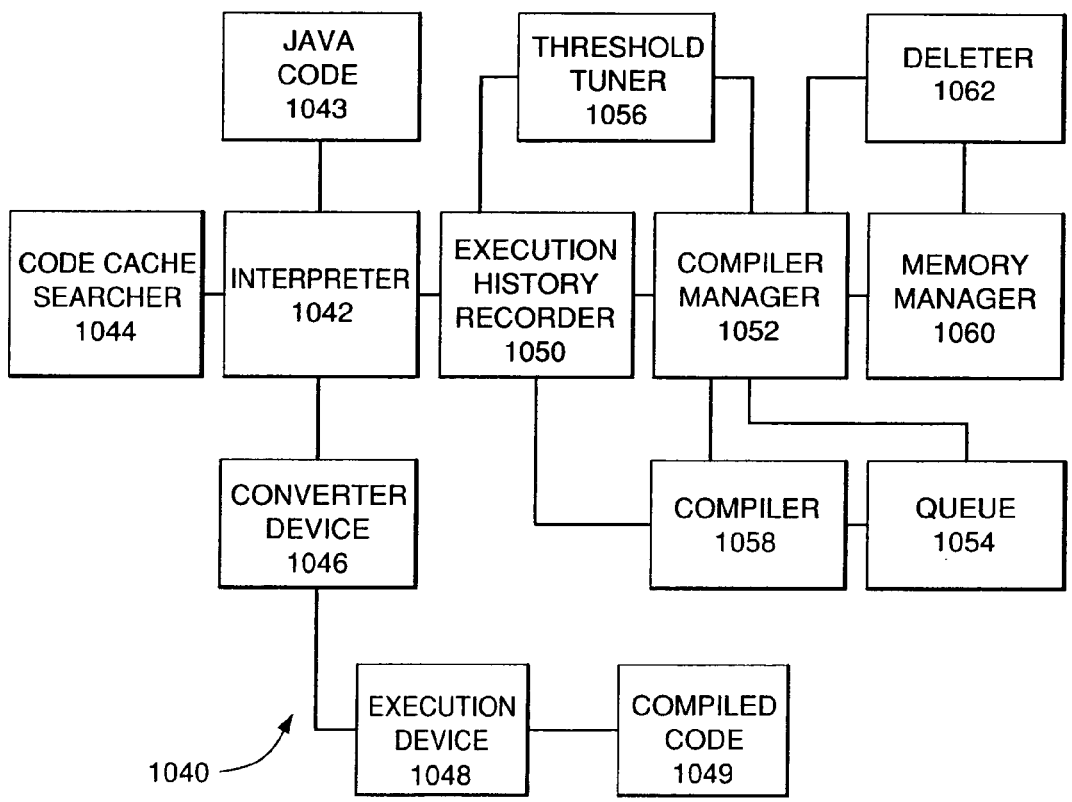
FIG. A1-4

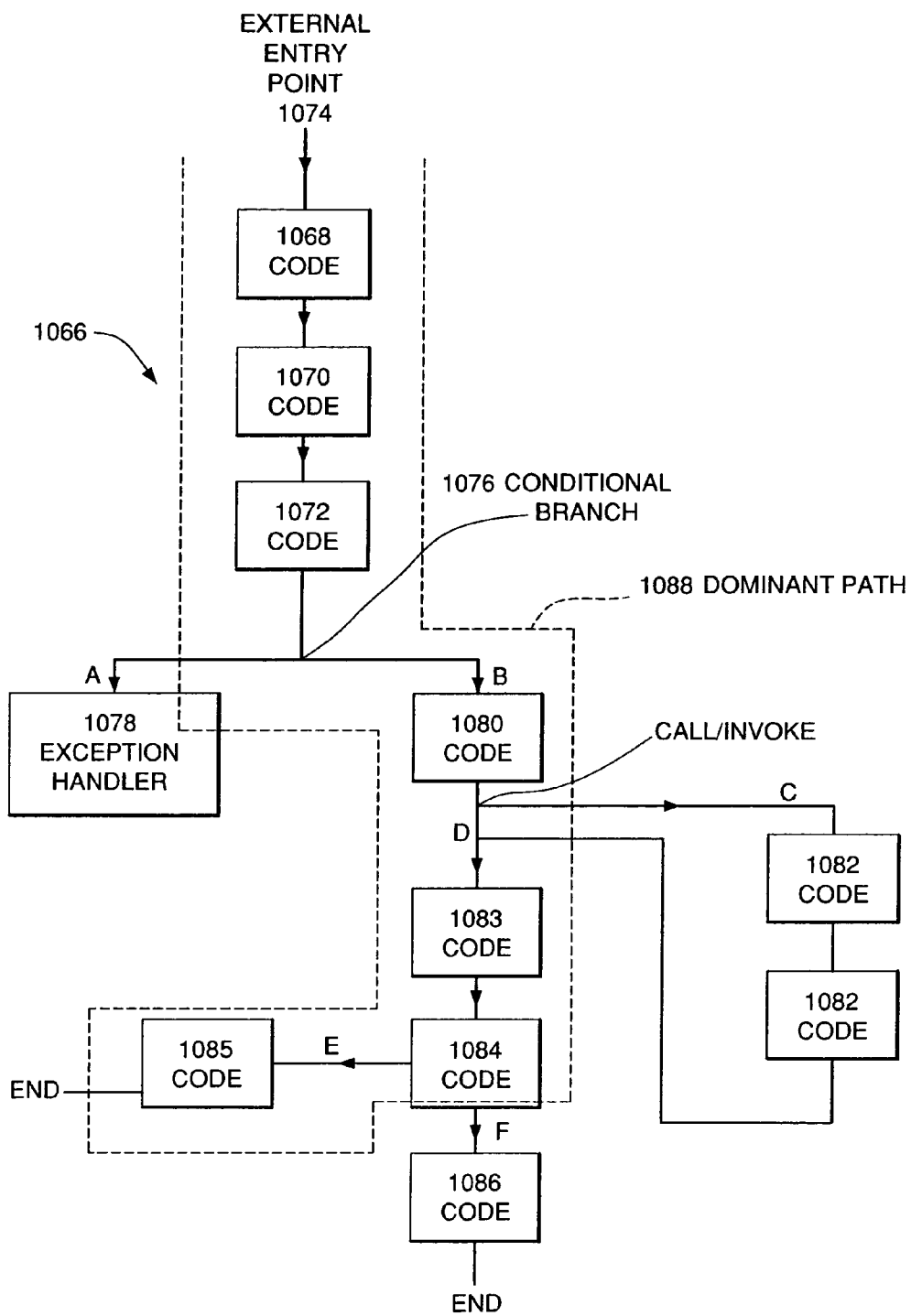
FIG. A1-5

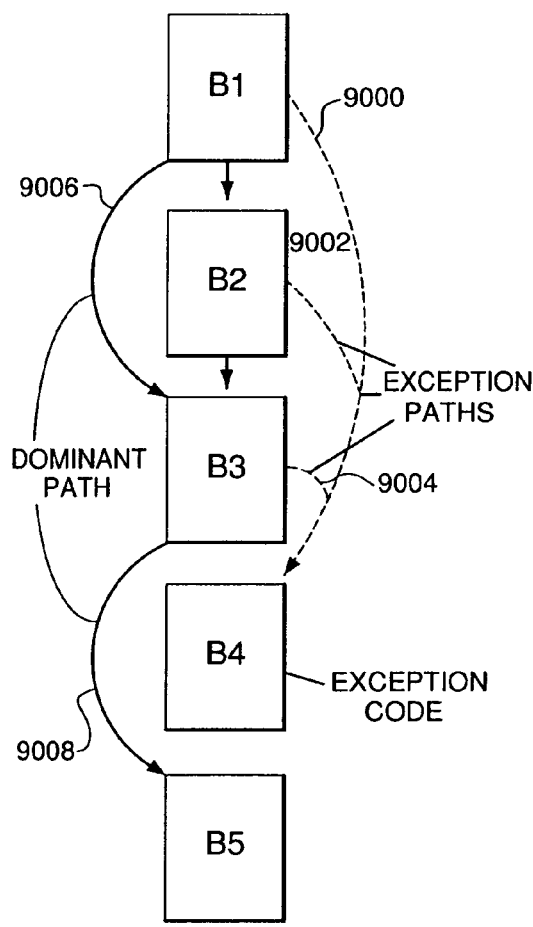
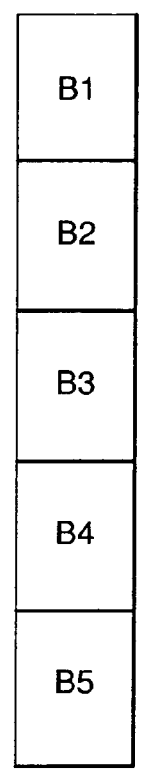
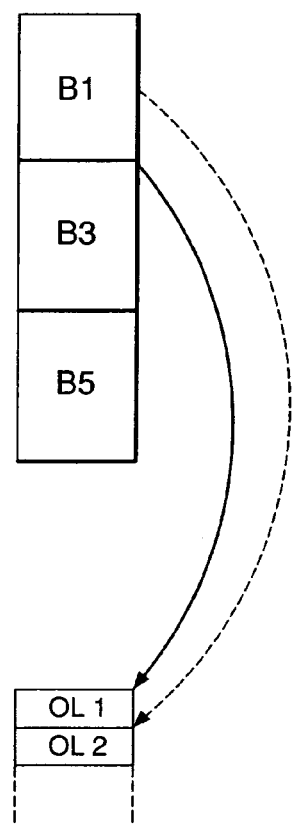
FIG. A2-1  FIG. A2-2  FIG. A2-3

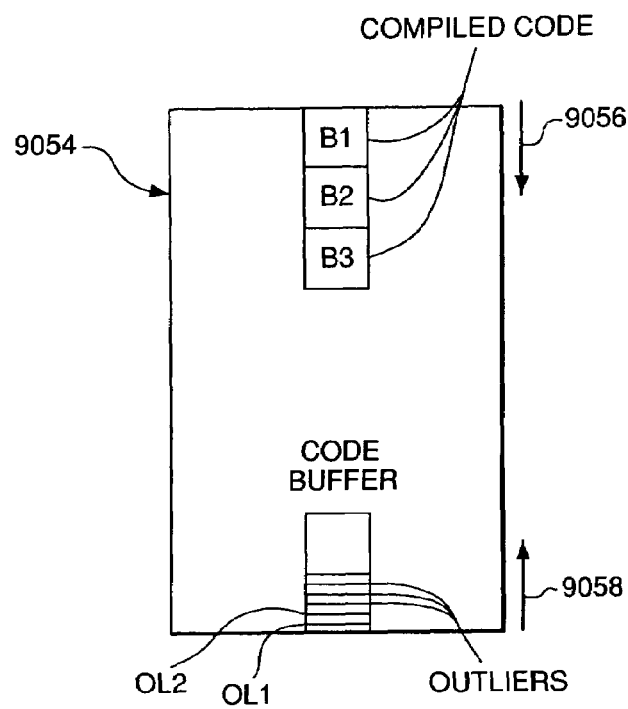
FIG. A2-4
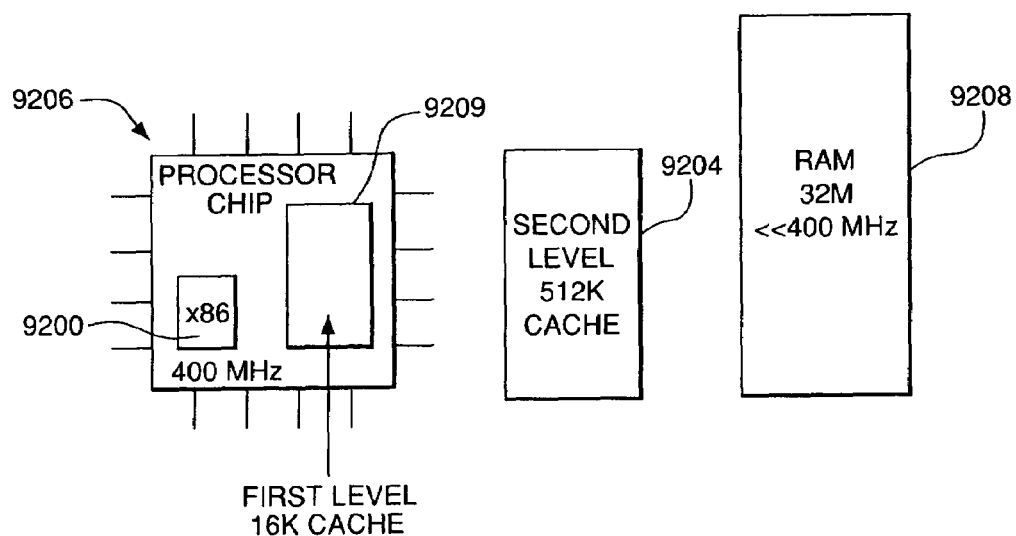
FIG. A2-5

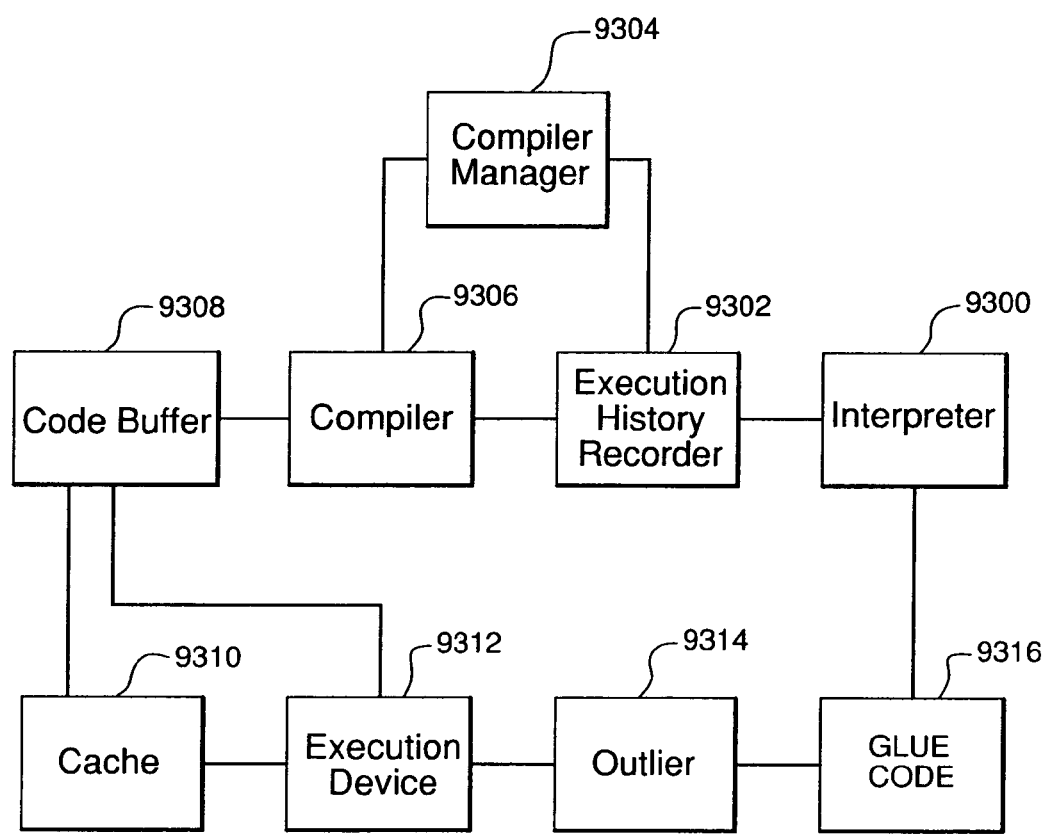
FIG. A2-6

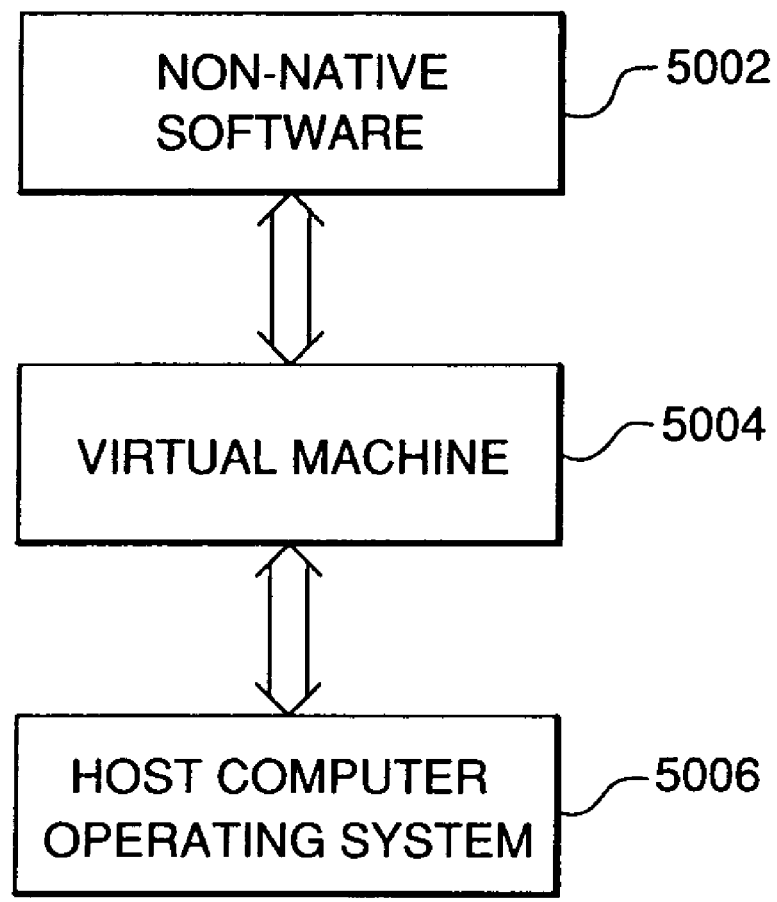
FIG. A3-1

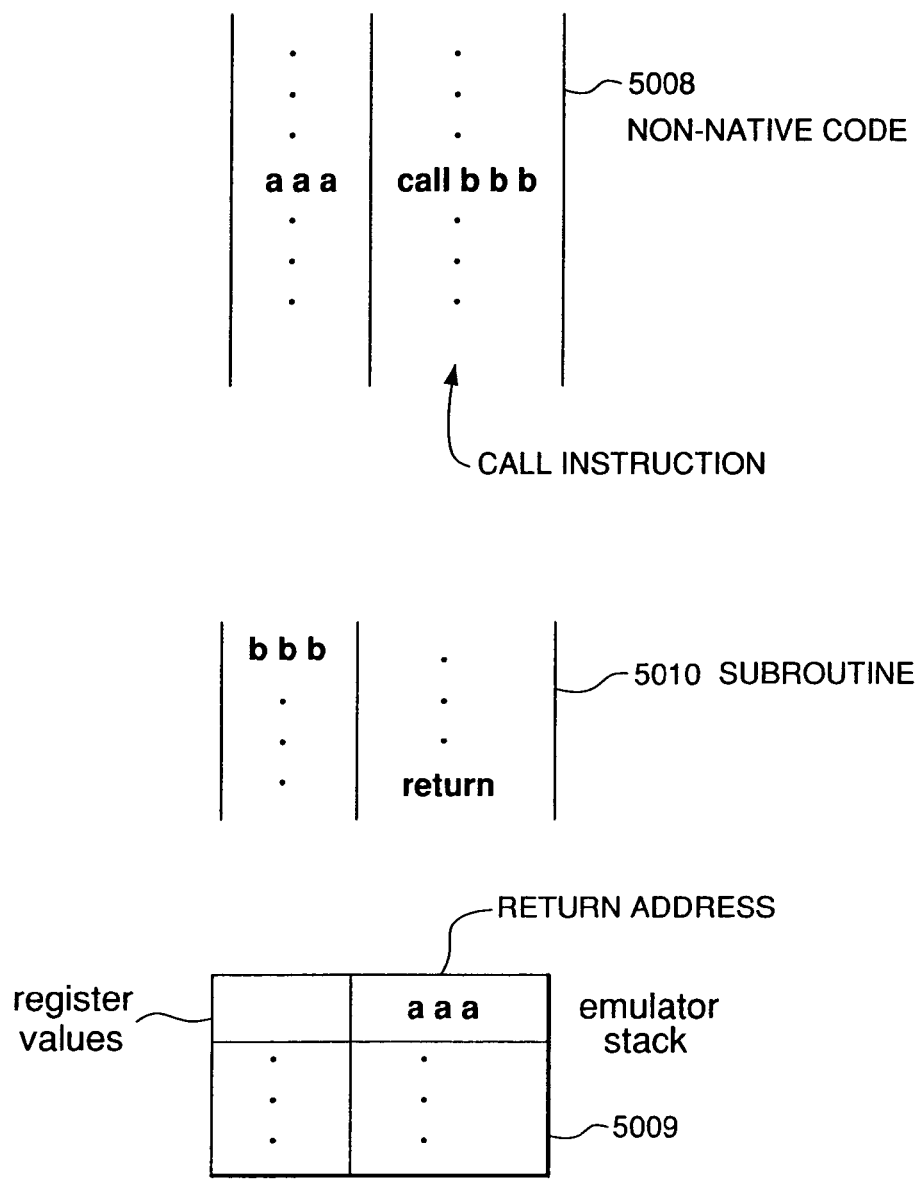
FIG. A3-2

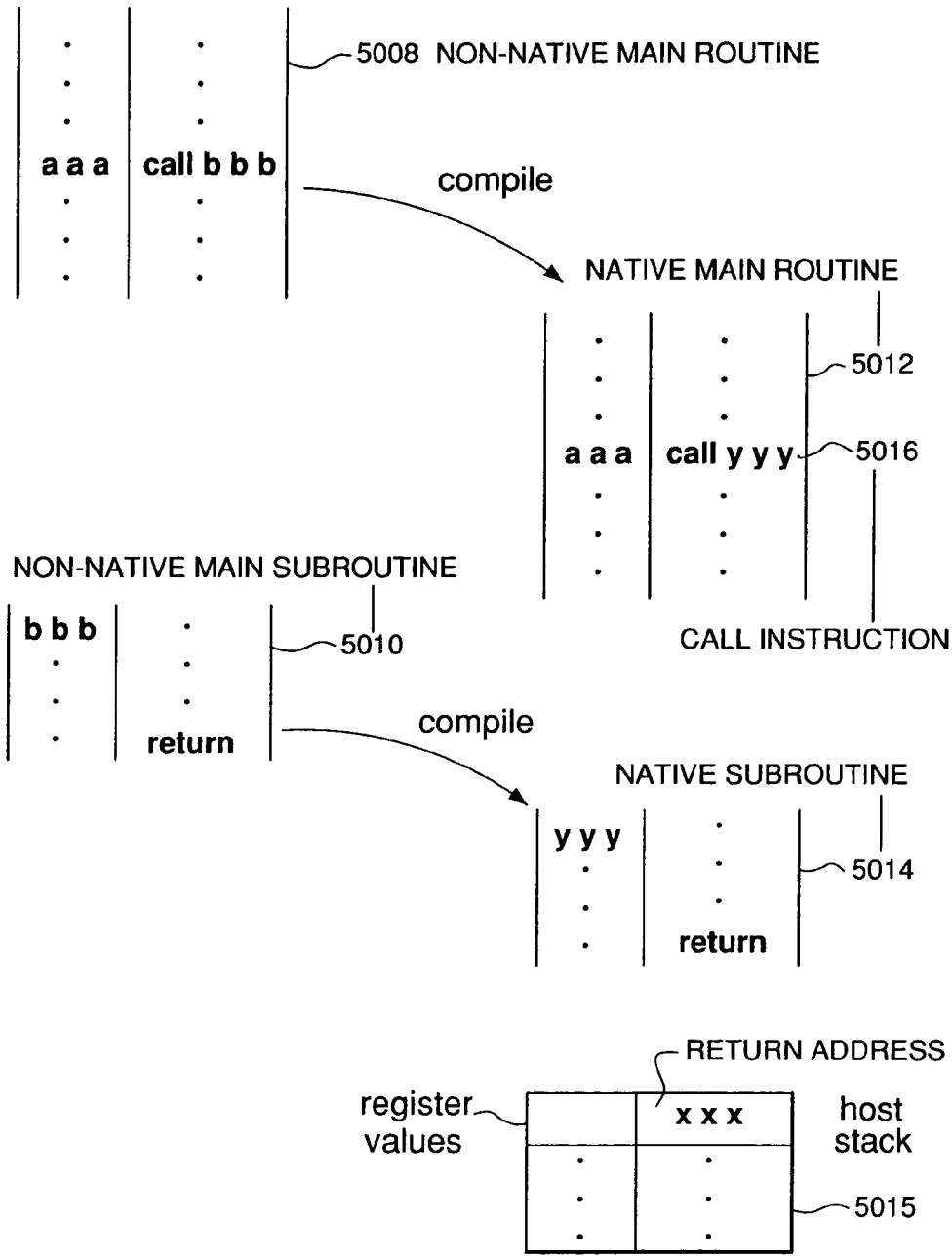
FIG. A3-3

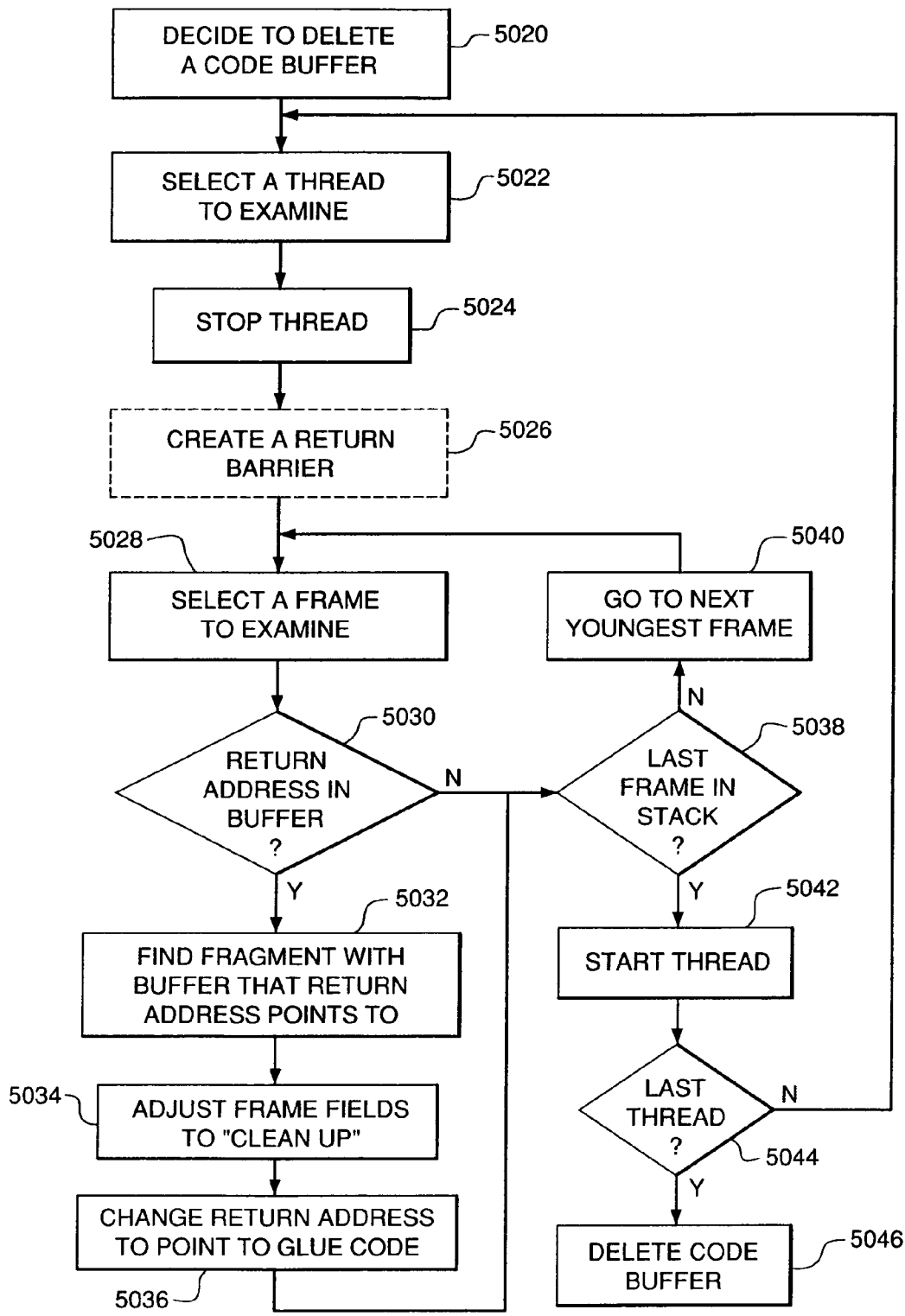
FIG. A3-4

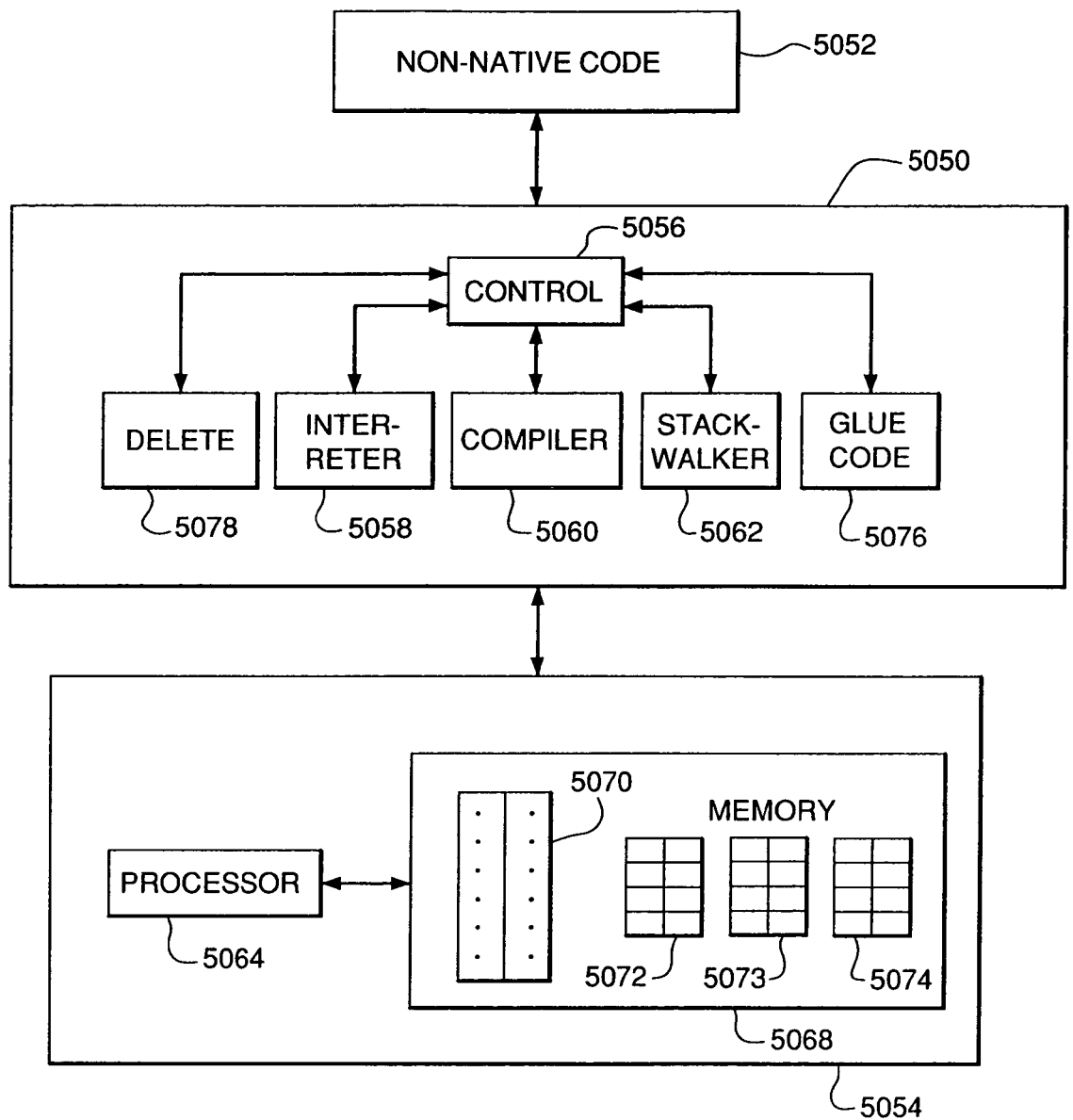
FIG. A3-5

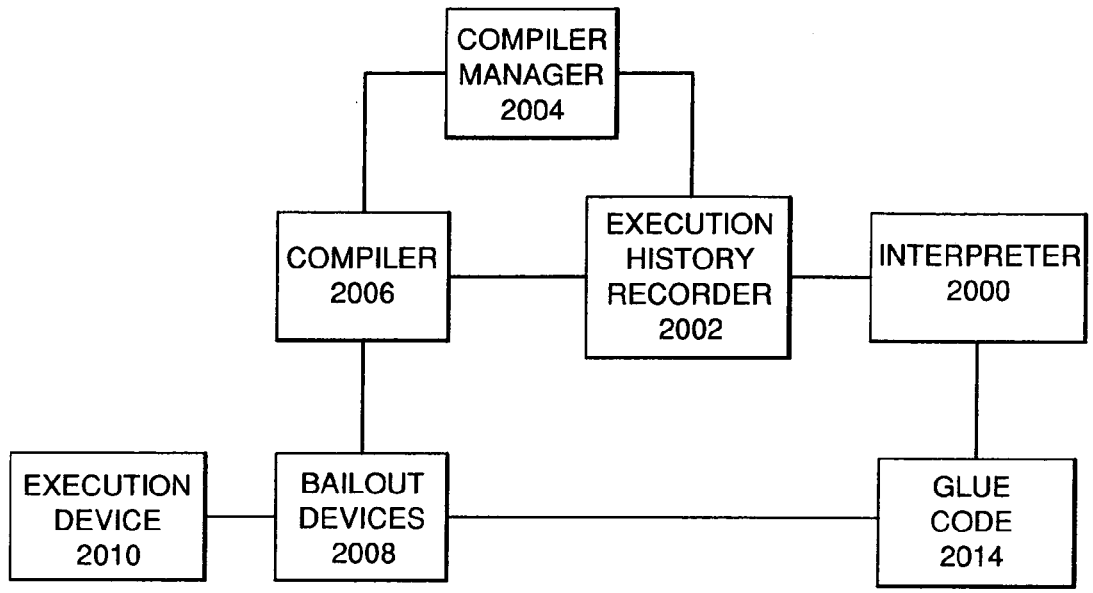
FIG. A4-1
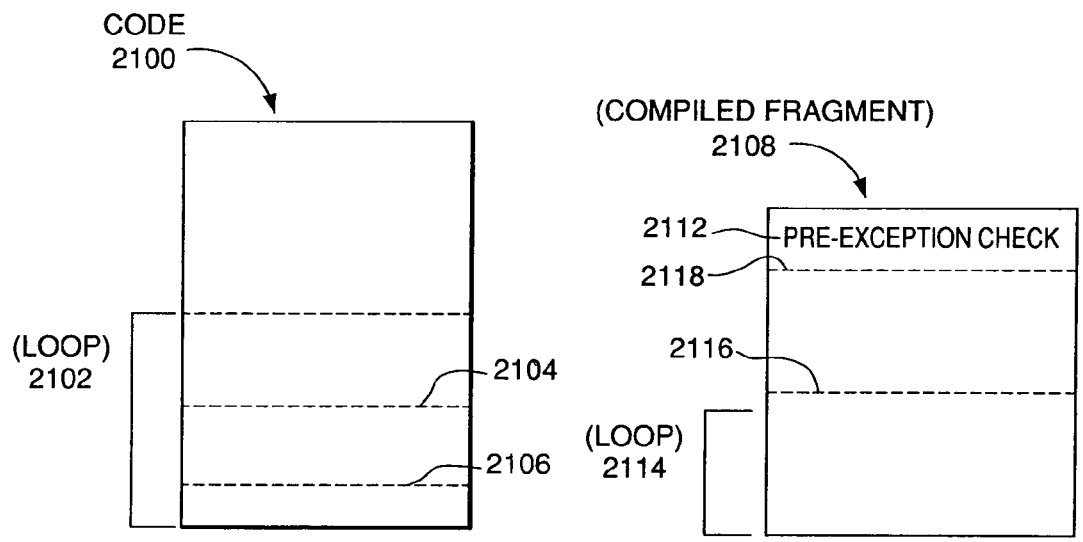
FIG. A4-2　　　　FIG. A4-3

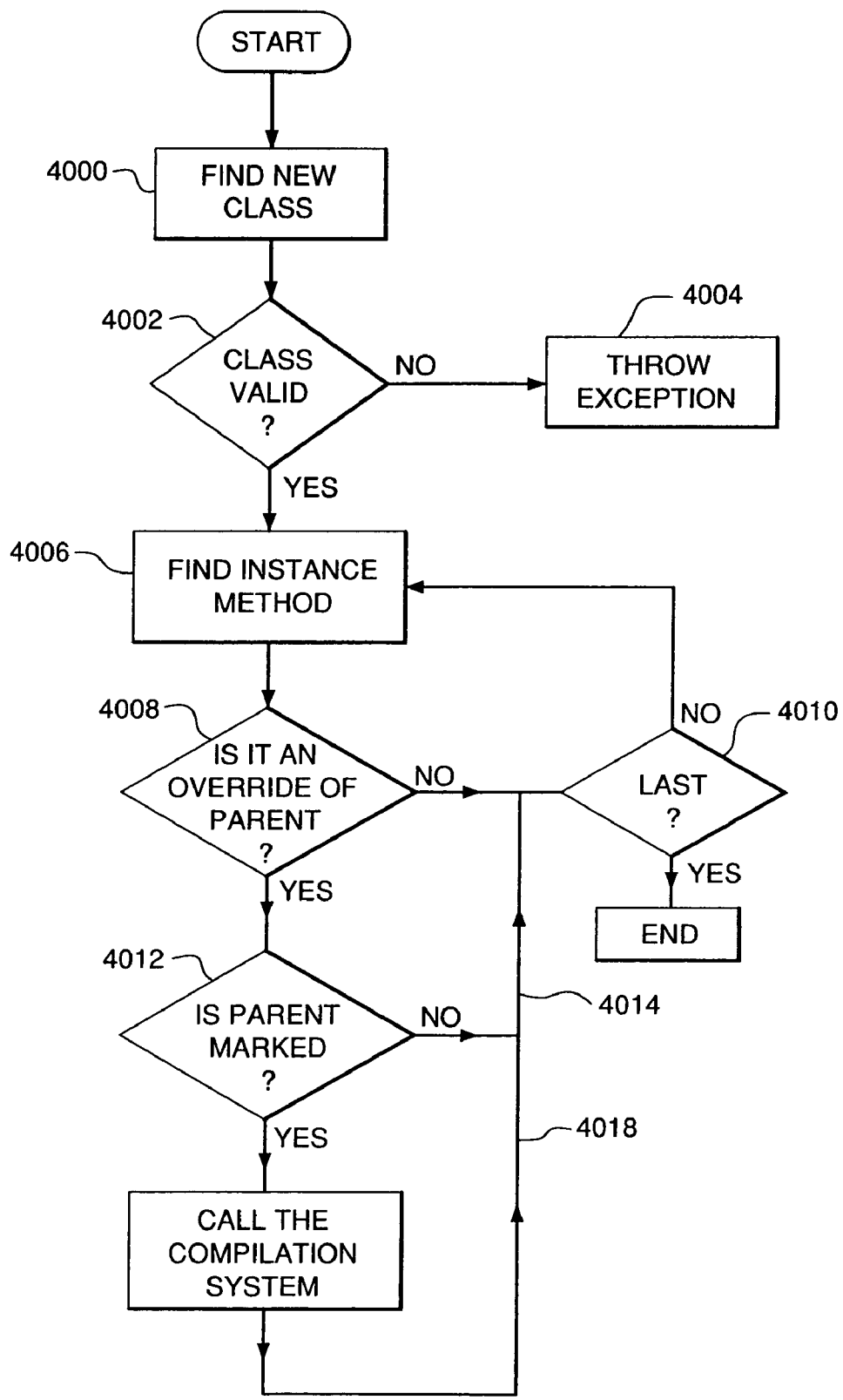
FIG. A5-1

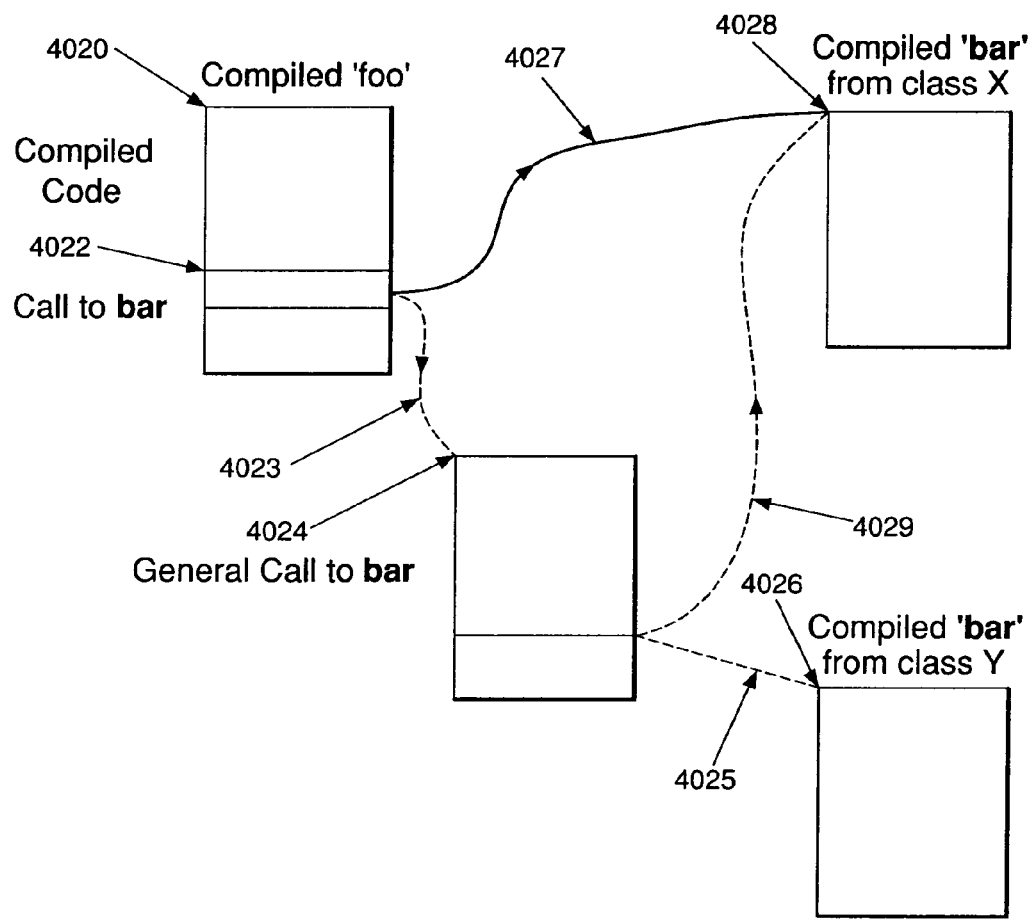
FIG. A5-2

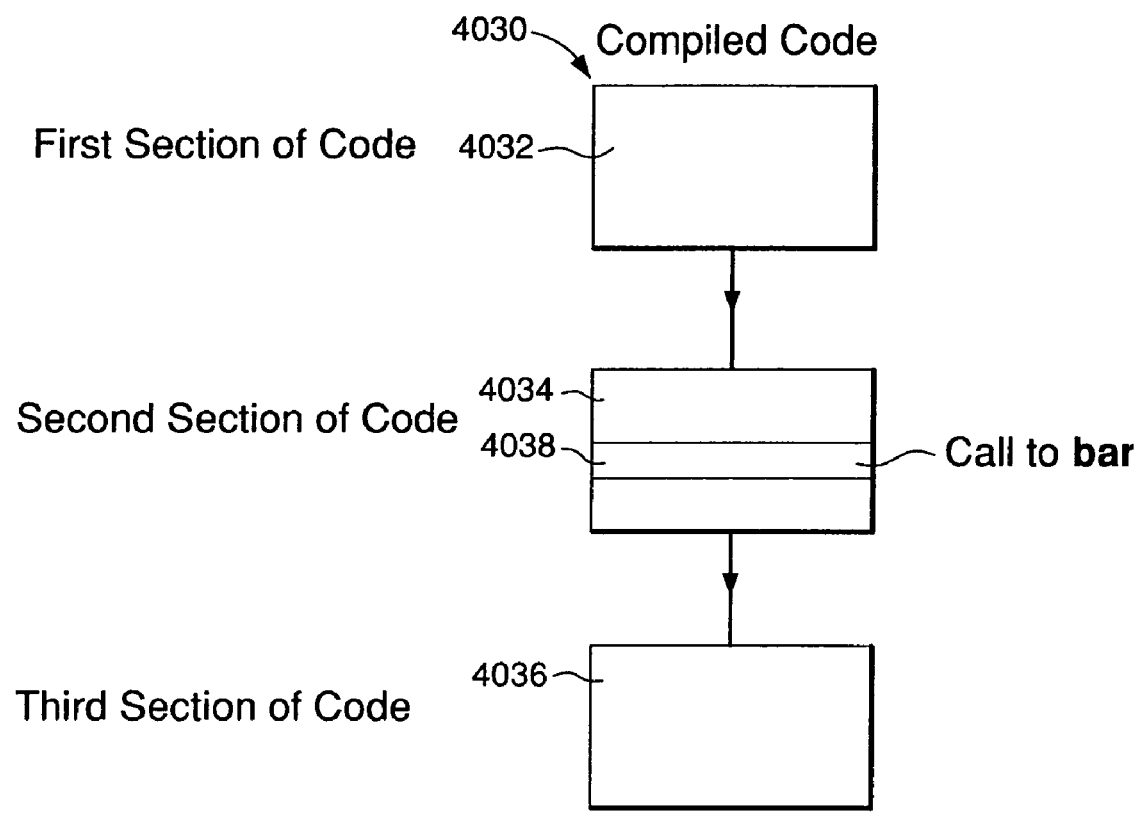
FIG. A5-3

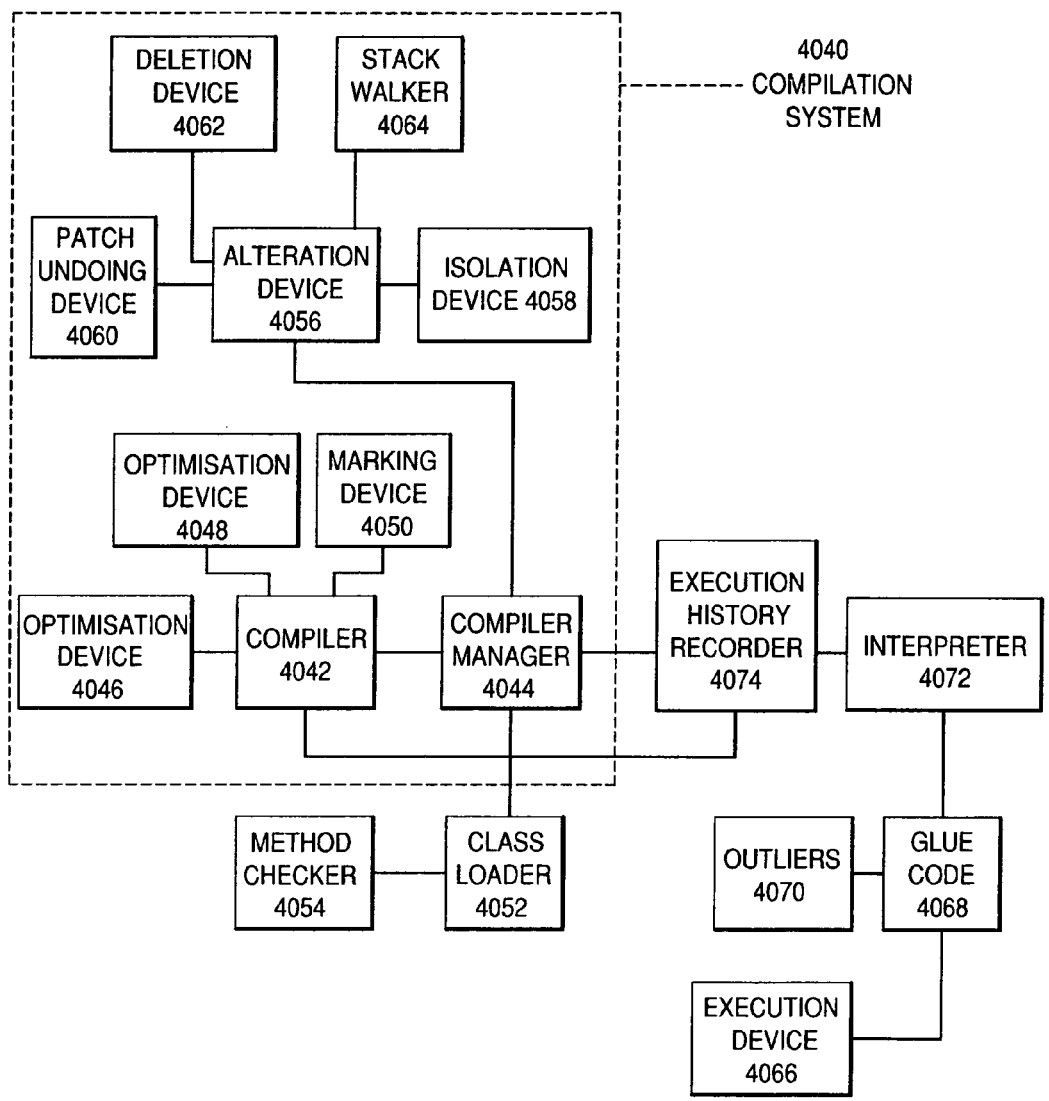
FIG. A5-4

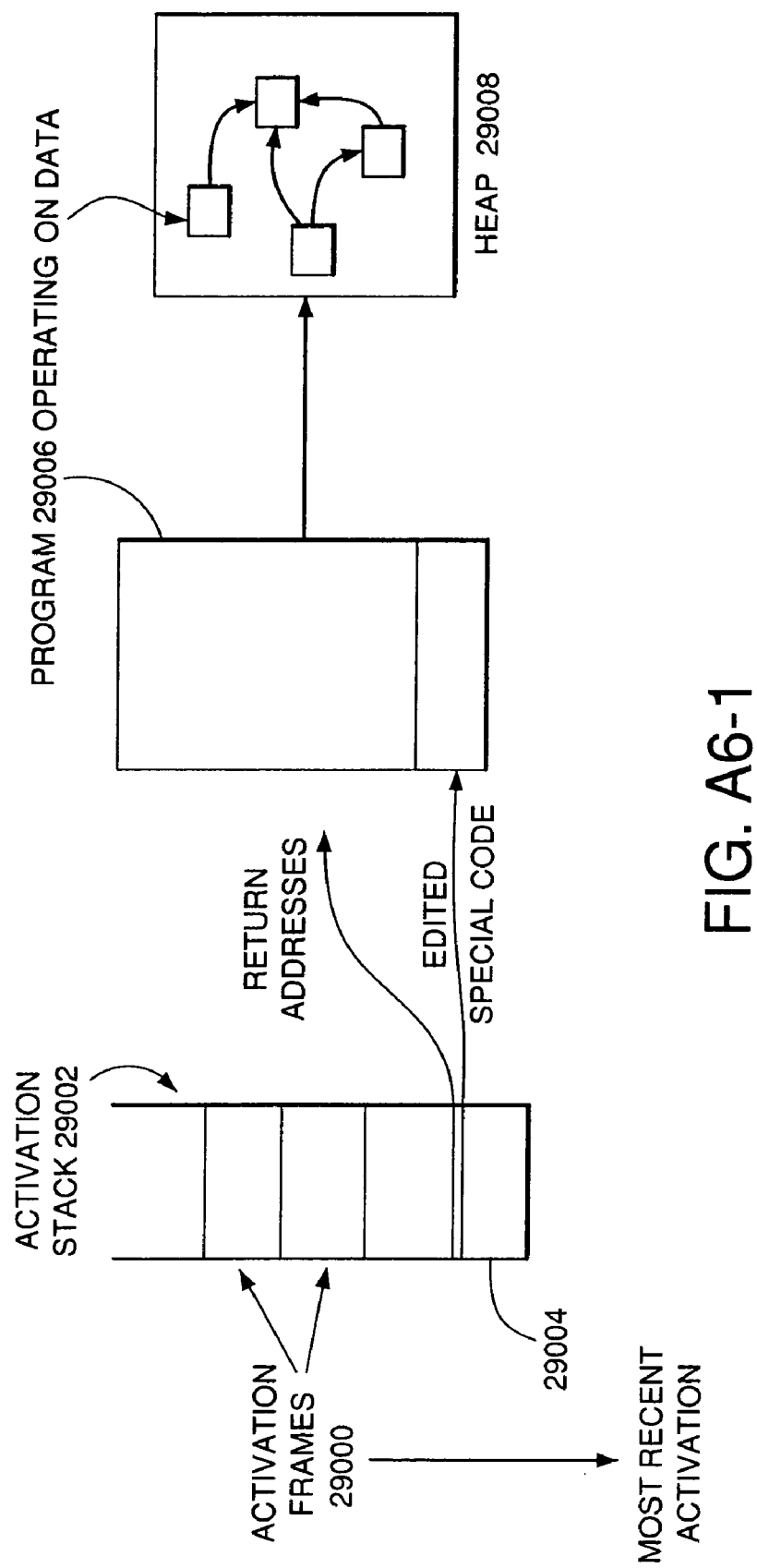
FIG. A6-1

FIG. A6-2
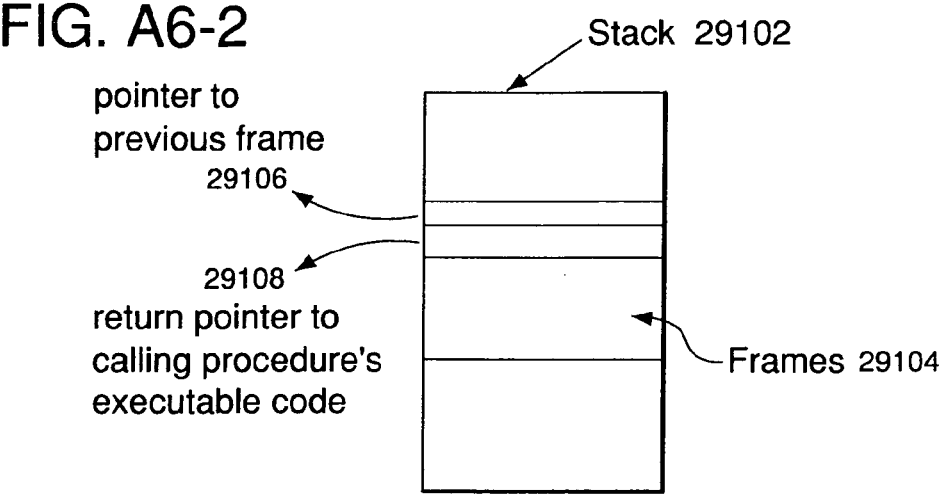
FIG. A6-3
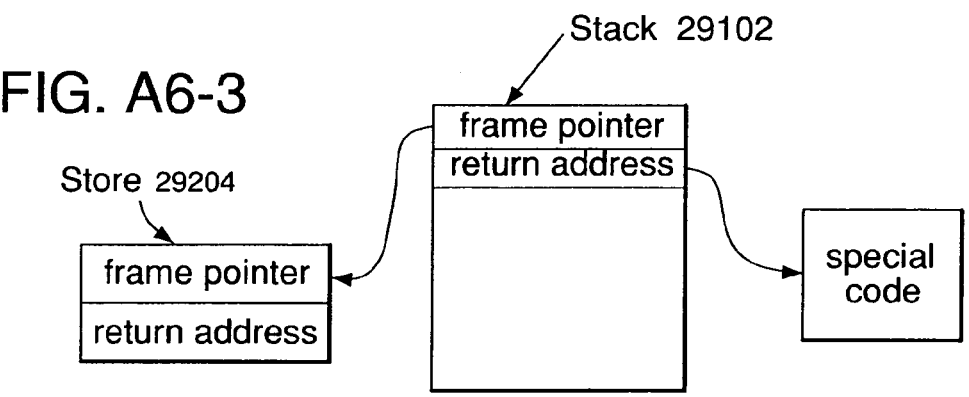
FIG. A6-4
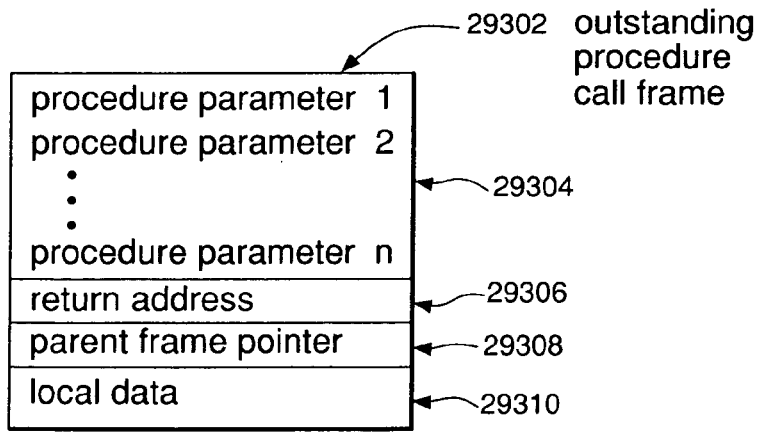

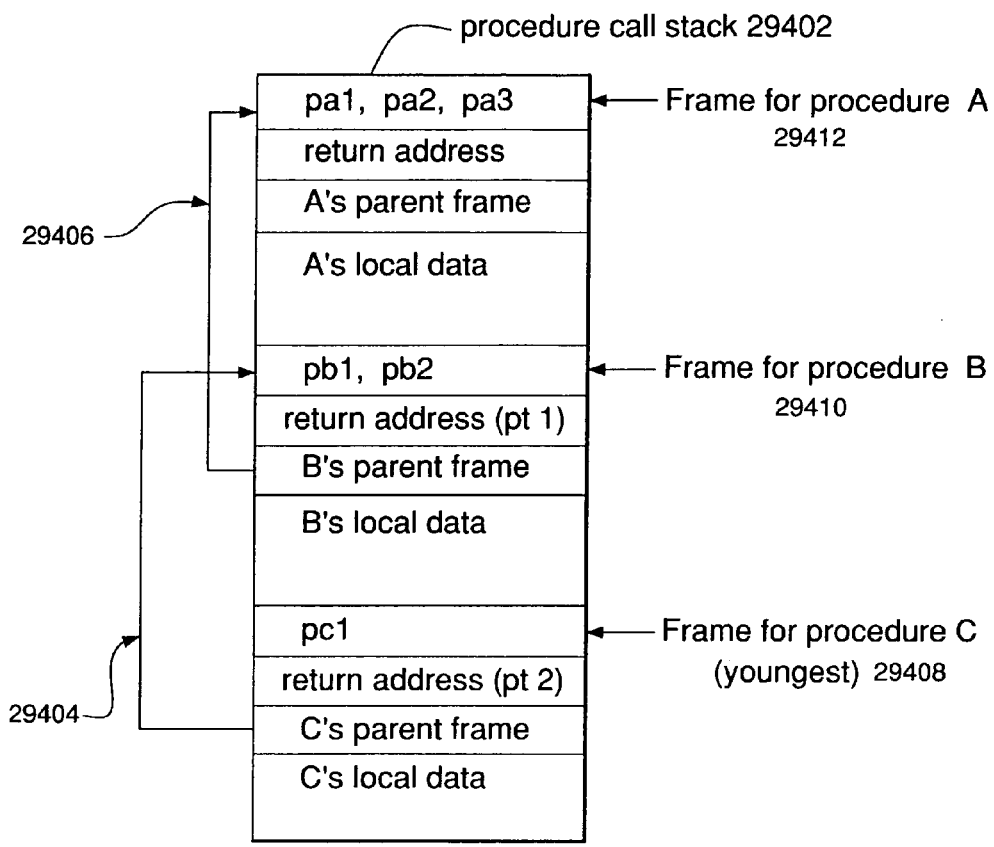
FIG. A6-5
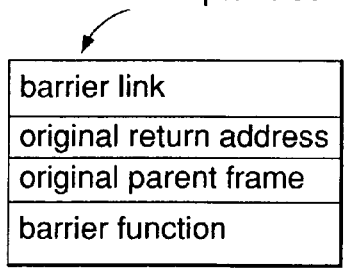
FIG. A6-6

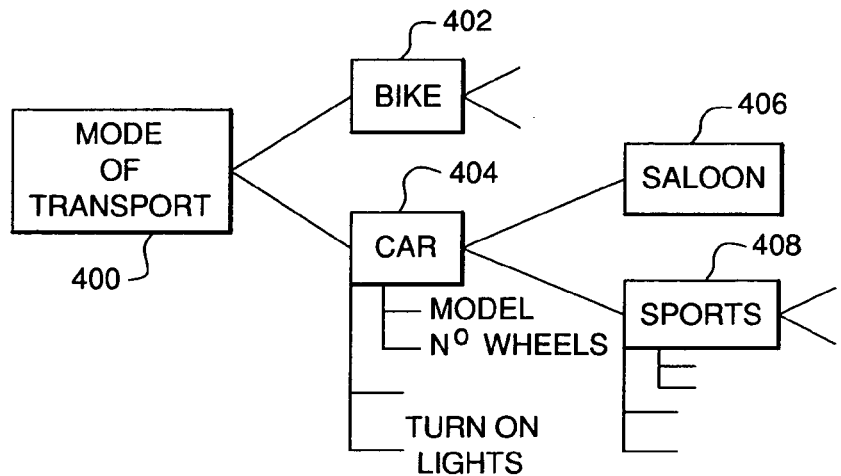
Fig. A7-1
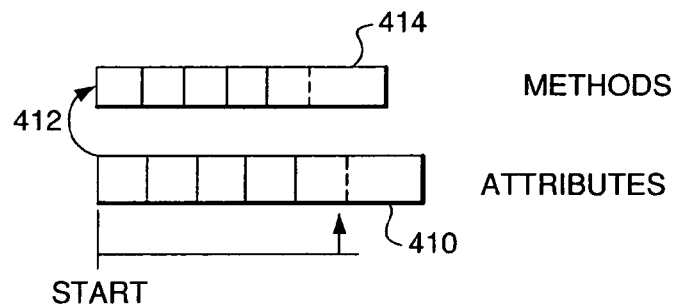
Fig. A7-2
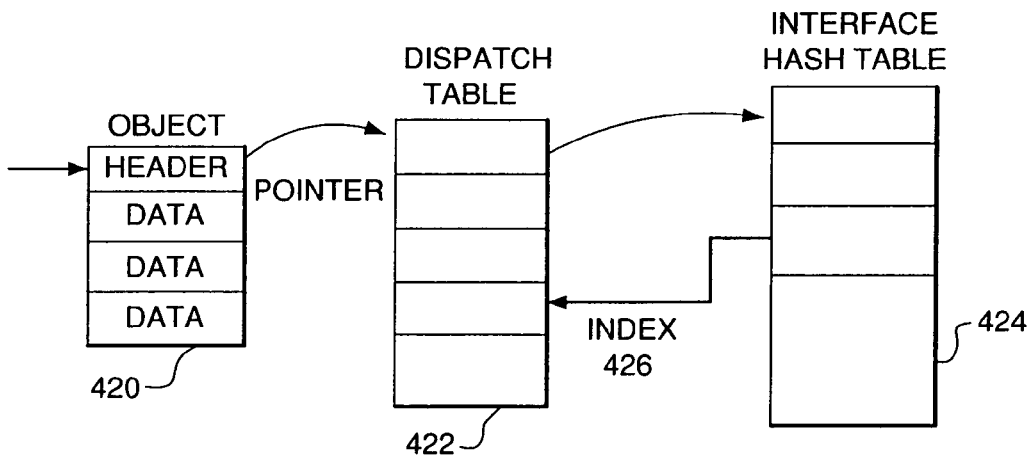
Fig. A7-3

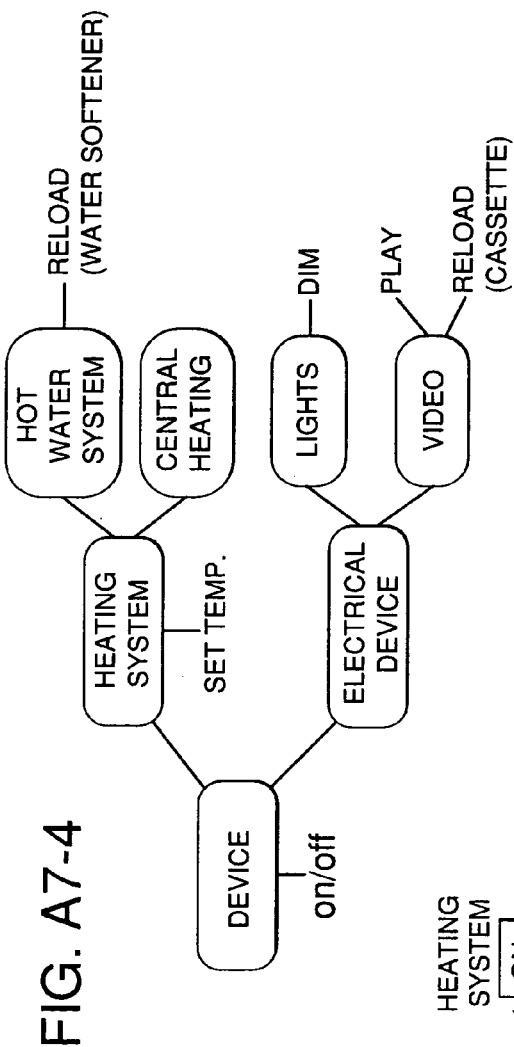
FIG. A7-4
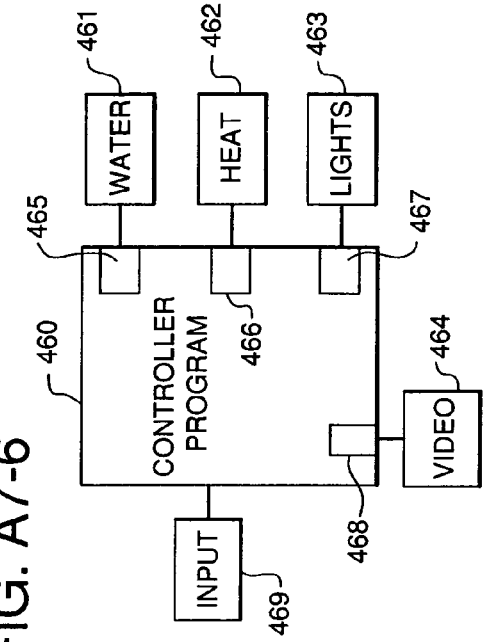
FIG. A7-6
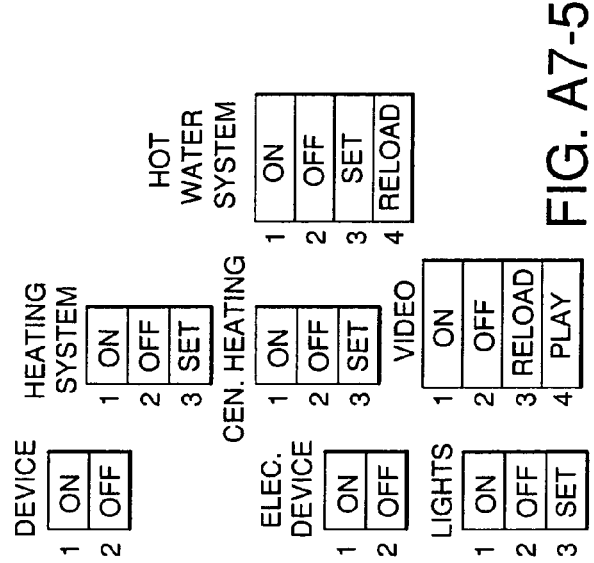
FIG. A7-5

MULTI-THREADED FRAGMENT PATCHING

CROSS-REFERENCE TO RELATED APPLICATIONS

This is a continuation of International Application PCT/GB99/00788, filed on Mar. 16, 1999, which claims priority to U.K. Patent Application GB9825102.8, filed on Nov. 16, 1998, now abandoned, and all of whose entire disclosures are incorporated by reference herein.

BACKGROUND OF THE INVENTION

1. Field of Invention

The present invention relates in one aspect to a method of creating a link from a first piece of compiled code to a second piece of compiled code, and to a method of compiling code. It relates in another aspect to methods of and apparatus for examining memory in a computer system to allow a section of compiled code to be deleted, and to a method of and apparatus for deleting compiled code in a computer system, in particular where there may be a link between sections of compiled code. The invention has particular (but not exclusive) application to a self-modifying multi-threaded environment. In a preferred embodiment, the invention relates to multi-threaded fragment patching.

2. Description of Related Art

In recent years, there have been developments in programming languages towards what is known as an object-oriented language. In these developments, concepts are regarded as 'objects', each carrying with it a set of data, or attributes, pertinent to that object, as well as information relating to so-called 'methods', that is functions or subroutines, that can be performed on that object and its data. This is well known to those skilled in the art of computing and/or programming.

The advent and rapid advancement in the spread and availability of computers has led to the independent development of different types of systems, such as the IBM and IBM-compatible PC running IBM-DOS or MS-DOS or MS-Windows applications, the Apple Macintosh machines 3 running their own Apple System operating system, or various Unix machines running their own Unix operating systems. This proliferation of independent systems has led to useful applications being available only in one format and not being capable of running on a machine for which the application was not designed.

Under such circumstances, programmers have devised software which 'emulates' the host computer's operating system so that a 'foreign' application can be made to run successfully in such a way that, as far as the user is concerned, the emulation is invisible. In other words, the user can perform all of the normal functions of say a Windows-based application on a Unix machine using a Unix-based operating system without noticing that he is doing so.

A particularly notable product of this type is that developed by Insignia Solutions of High Wycombe, GB and Santa Clara, Calif., USA and known under the name 'SoftWindows 2.0 for Powermac'. This software enables a physical Macintosh computer to emulate a PC having an Intel 80486DX processor and 80487 maths co-processor plus memory, two hard disks, IBM-style keyboard, color display and other features normally found on recent versions of the PC-type of computer.

Furthermore, there is an ever-increasing demand by the consumer for electronics gadgetry, communications and control systems which, like computers, have developed independently of one another and have led to incompatibility between operating systems and protocols. For example, remote-control devices for video players, tape players and CD players have similar functions, analogous to 'play,' 'forward,' 'reverse,' 'pause,' etc, but the codes for transmission between the remote control, or commander, operated by the user may not be compatible either between different types of equipment made by the same manufacturer or between the same types of equipment made by different manufacturers. There would be clear benefits of having software within the equipment which can produce for example the correct 'play' code based upon a 'play' command regardless of the specific hardware used in the equipment. Such software is commonly known as a 'Virtual Machine.'

Other uses and applications are legion: for example, set-top boxes for decoding television transmissions, remote diagnostic equipment, in-car navigation systems and so-called 'Personal Digital Assistants.' Mobile telephones, for instance, can have a system upgrade downloaded to them from any service provider.

Emulation software packages tend to have certain features in common, notably that they are not general purpose but are dedicated. They are of most benefit in rapid development areas and have a distinct advantage in enabling manufacturers to cut costs. In particular, they can divorce software from the physical machine, i.e., the effect of the software in the physical machine can be altered by the emulating software without having to go into the machine's native software to implement those changes.

The specific object-oriented language used in some of the implementations described later is that known as Java (registered trade mark to Sun Microsystems Corporation). Some of the following implementations will enable Java to be used in smaller devices than is currently possible because of the improved performance and/or reduced memory footprint. Future uses projected for embedded software (virtual machines) include computers worn on the body, office equipment, household appliances, and intelligent houses and cars.

While it is recognised that there are clear advantages in the use of virtual machines, especially those using object-oriented languages, there are naturally areas where it is important and/or beneficial for some of the operations that are carried out within the system to be optimised.

These may include reducing the memory requirement, increasing the speed of operation, and improving the 'transparency' of the system when embedded in another system. One of the principal aims of the invention described herein is to provide a Virtual Machine which is optimised to work as quickly as possible with in a memory constraint of, for example, less than 10, 5, 2 or even 1 Mbyte. Such a constraint is likely to be applicable, for example, to electronics gadgetry and other equipment where cost (or size) is a major constraint.

A self-modifying environment may be one in which sections of compiled code are created and deleted dynamically during execution. Such an environment is described in Agent's Reference No. 1 of this specification. A multi-threaded environment is one in which several processes, or threads, operate asynchronously in the same workspace.

In a self-modifying environment there may be situations in which a link must be made between a first section of compiled code and a second section of compiled code that is located elsewhere in the workspace, to enable execution to transfer between the two sections of code. The process of transferring execution from one piece of code to the other generally involves a number of steps, including putting the address of the first piece of code on the stack, together with register values, transferring execution to an intermediate piece of code that identifies the location of the second piece of code, and then transferring execution to the second piece of code. A problem with transferring execution in this way is that a relatively large amount of time is spent in making the transfer.

BRIEF SUMMARY OF THE INVENTION

In a first aspect of the present invention there is provided a method of providing a link between two pieces of compiled code in a self-modifying multi-threaded computer system, including inserting a patch from one piece of compiled code to the other.

By providing patches from one piece of compiled code to another, execution may transfer more quickly than if the patches were not made.

The step of inserting a patch may include changing a control transfer instruction within the compiled code. The control transfer instruction may be any instruction which causes execution to transfer to another address, such as a jump instruction or a call instruction. The control transfer instruction may be changed to point to the address of the piece of code to which a patch is made.

The step of changing a control transfer instruction may be carried out atomically. By atomically it is preferably meant that the other threads cannot view the area being changed in a partially changed form. This may be achieved for a single processor system by ensuring that the step of inserting a patch is carried out as a single write operation. Alternatively, some processors provide one or more special instructions or sequences of special instructions which are defined to ensure atomicity; such instructions may be used to ensure atomicity in single processor and multi-processor systems. In this way it can be ensured that patch manipulation is completed before any other operations which may influence the work space are carried out.

The first aspect of the invention also provides an apparatus for providing a link between two pieces of compiled code in a self-modifying multi-threaded computer system, including means for inserting a patch from one piece of compiled code to the other.

The first aspect of the invention also provides a method of compiling code, the code including two possible paths of execution, the method including compiling the code corresponding to one of the paths of execution, and including in the compiled code a control transfer instruction which is capable of being changed atomically to point to the address of another piece of code.

In this way, the compiled code can be arranged so that a patch to another piece of code can be made after the code has been compiled, in particular, to enable the other path to be executed.

Preferably, the control transfer instruction is of a type which can point to an address which is further from its own address than if the most optimum form of the control transfer instruction were used. This feature can allow the patch to be to a more distant piece of code than would otherwise be the case.

The method may include forming an outlying section of code which includes the control transfer instruction.

The first aspect of the invention also provides a compiler adapted to carry out any of the above methods of compiling code.

In some circumstances it may be desirable or necessary to remove the patches which have been made, for example, because a code buffer containing a section of compiled code is to be deleted, or because assumptions which where made about a piece of compiled code prove not to be valid.

Thus, in a second aspect of the invention there is provided a method of examining memory containing a section of compiled code in a self-modifying multi-threaded computer system, including identifying any patches into the section of compiled code, and redirecting any such patches. The method may be carried out, for example, because a section of compiled code is to be deleted, or because the section of compiled code is no longer to be used. The redirection of the patch enables execution to continue at the patch without the section of compiled code.

The second aspect of the invention further provides a method of deleting compiled code in a self-modifying multi-threaded computer system, including selecting a section of compiled code to be deleted, identifying any patches into the section of compiled code, redirecting any such patches, and deleting the section of compiled code.

Preferably, any such patches are directed to the address of a continuation code. The continuation code enables execution to continue without the section of code. The continuation code may be arranged to effect interpretation of subsequent instructions, or it may be arranged to perform a dispatch table transfer.

Preferably, the step of redirecting a patch is done atomically, to ensure that other threads cannot access the location being patched when the patch operation is only partially completed. An alternative solution would be to stop all executing threads while the patch was redirected, but that is less preferred due to the execution time lost while the threads are stopped.

In order to identify patches going into the section of compiled code, the method may include calculating a hash value of the address of the section of compiled code, and examining a hash table of patch blocks to identify any patches into the section of compiled code.

In the interests of efficient memory usage, any unused patches (such as patches out of the code buffer) should be deleted, so that the overhead associated with the patch can be reclaimed. Therefore, the method preferably further includes identifying any patches out of the section of compiled code, and removing any such patches.

Thus, the second aspect of the present invention also provides a method of examining memory in a self-modifying multi-threaded computer system when a section of compiled code is to be deleted, including identifying any patches out of the section of compiled code and removing any such patches.

Preferably the method of examining memory further includes the steps of:

examining a frame of a stack in the computer system;

identifying whether the frame contains a return address which is in the range of addresses of the section of compiled code to be deleted;

and altering the contents of the frame when such a return address is identified.

Thus, the second aspect of the invention also provides a method of examining memory in a self-modifying multi-threaded computer system to allow a section of compiled code to be deleted, the method including the steps of:

examining a frame of a stack in the computer system;

identifying whether the frame contains a return address which is in the range of addresses of the section of compiled code;

altering the contents of the frame when such a return address is found;

identifying any patches into the section of compiled code; and redirecting any such patch.

Thus the second aspect of the invention preferably includes one or more of the features of one or more aspects of the invention described in Appendix 3 of this specification.

Preferably, the method further includes identifying any patches out of the section of compiled code and removing any such patches.

Preferably, the alteration of the contents of the frame and/or the redirecting of the patch are carried out at the time of deletion of the section of compiled code rather than, for example, as patches or returns into the deleted code are found during execution.

The second aspect of the invention also provides apparatus for examining memory in a self-modifying multi-threaded computer system to allow a section of compiled code to be deleted, including means for identifying any patches into the section of compiled code, and means for redirecting any such patches. Thus, execution may continue at the patch without the section of compiled code.

The second aspect of the invention also provides an apparatus for deleting compiled code in a self-modifying multi-threaded computer system, including means for selecting a section of compiled code to be deleted, means for identifying any patches into the section of compiled code, means for redirecting any such patches, and means for deleting the section of compiled code.

Preferably, the apparatus includes means for calculating a hash value of the address of the section of compiled code, and means for examining a hash table of patch blocks to identify any patches into the section of compiled code.

Preferably, the apparatus further includes means for identifying any patches out of the section of compiled code, and means for removing any such patches.

The second aspect of the invention also provides apparatus for examining memory in a self-modifying multi-threaded computer system to allow a section of compiled code to be deleted including means for identifying any patches out of the section of compiled code and means for removing any such patches.

Features of one aspect may be applied to other aspects; similarly, method features may be applied to the apparatus and vice versa.

BRIEF DESCRIPTION OF SEVERAL VIEWS OF THE DRAWINGS

The invention will be described in conjunction with the following drawings in which like reference numerals designate like elements and wherein.

FIG. A1-1 shows paths of execution;

FIG. A1-2 shows the comparative costs of compiling dominant paths;

FIG. A 1-3 shows a dispatch table;

FIG. A1-4 is a schematic representation of apparatus for carrying out the invention;

FIG. A 1-5 shows paths of execution through code;

FIG. A2-1 shows a section of code before compilation;

FIG. A2-2 shows a standard compilation of the code of FIG. A2-1;

FIG. A2-3 shows compilation of code in accordance with a preferred embodiment;

FIG. A2-4 shows a code buffer;

FIG. A2-5 shows the memory arrangement in a computer system;

FIG. A2-6 shows an apparatus for carrying out the method of the present invention;

FIG. A3-1 illustrates the principle of a virtual machine;

FIG. A3-2 illustrates the operation of an emulator stack;

FIG. A3-3 illustrates the operation of a unified stack;

FIG. A3-4 shows an embodiment of the present invention;

FIG. A3-5 shows an apparatus embodiment of the present invention;

FIG. A4-1 shows apparatus for carrying out the method of the invention;

FIG. A4-2 shows a fragment of code including an exception;

FIG. A4-3 shows a compiled fragment of code in accordance with the present invention;

FIG. A5-1 shows a flow diagram illustrating a class loader that checks for instance Methods of a new class being loaded;

FIG. A5-2 shows a section of compiled code;

FIG. A5-3 shows a different section of compiled code;

FIG. A5-4 shows an apparatus for carrying out a preferred embodiment;

FIG. A6-1 is a schematic illustration of data storage in a stack;

FIG. A6-2 shows an activation stack;

FIG. A6-3 illustrates how checks are made on references in a frame;

FIG. A6-4 shows the arrangement of data in a procedure call frame;

FIG. A6-5 shows the execution of a procedure;

FIG. A6-6 shows the arrangement of the contents of a barrier descriptor block;

FIG. A7-1 illustrates a hierarchical structure in object-oriented programming;

FIG. A7-2 shows the arrangement of data stored in dispatch tables;

FIG. A7-3 shows the application of an interface hash table to a dispatch table;

FIG. A7-4 is a hierarchical structure of a domestic equipment system;

FIG. A7-5 shows dispatch tables used in operating devices in the domestic system of FIG. A7-4; and FIG. A7-6 shows a controller program with driver devices for operating the devices in the domestic system of FIG. A7-4.

DETAILED DESCRIPTION OF THE INVENTION

The invention will be illustrated in more detail with reference to the following Examples, but it should be understood that the present invention is not deemed to be limited thereto.

Figure 1:
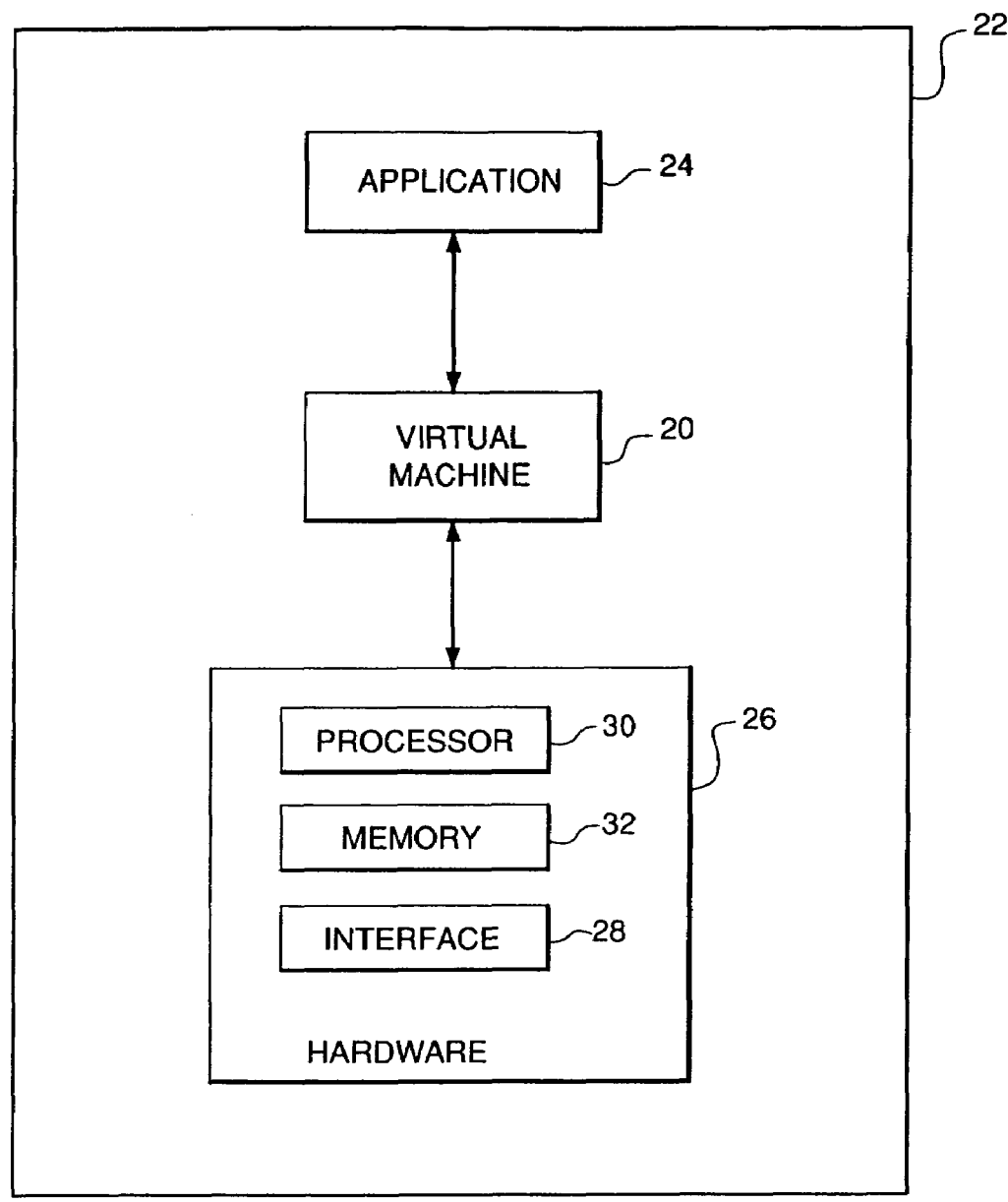
FIG. 1 is a block diagram a virtual machine of the present invention.

A specific example of a preferred embodiment of virtual machine is now described with reference to FIG. 1.

The virtual machine 20 is an executable code installed in the particular item of equipment 22. It can provide a degree of independence from the hardware and operating system. The virtual machine may typically include any, some, or all of the following features: an operating engine, a library of routines, one or more interpreters, one or more compilers, storage means for storing a plurality of instruction sequences, queue management means, and buffer management means.

The virtual machine is coupled to one or more applications 24 on one side (the "high level" side), and, on the other side (the "low level" side), perhaps via various intermediate logical units, to the hardware 26 of the item of equipment. The hardware can be regarded as including various ports or interfaces 28 (perhaps an interface for accepting user input); the virtual machine receives events from those ports or interfaces. The hardware also includes one or more processors/control means 30 and memory 32.

The following considerations apply to any and all the inventions and aspects of the inventions described above.

As described above in Appendix 1 of this specification, dynamic compilation may result in fragments of code in a method being compiled, rather than the whole method. The fragments that are compiled correspond to the dominant path, as determined, for example, from the run time representation of the source program and execution history information. At a later stage, other fragments of code may be compiled, for example, where the original assumptions that were made about the dominant path prove to be incorrect.

As an example, if the code contains a conditional control transfer instruction (such as a conditional branch instruction or a conditional call instruction), the compiler decides whether or not the transfer is likely to be made, and then compiles the code corresponding to the path that is most likely to be followed (the dominant path). However, during execution, it may be decided that in fact the other path should be followed. In such circumstances, when the transfer instruction is encountered, execution transfers to a piece of code known as 'glue code.' If the path that is to be followed has not been compiled, then the glue code causes interpretation of subsequent instructions in the path to be followed. If the interpreted path is followed a certain number of times, the compiler may decide that it is worthwhile compiling that section of code, and will then produce a compiled version of the code.

A self-modifying environment is thereby created, in which sections of compiled code are created (and possibly deleted) dynamically during execution. Such an environment is typically multi-threaded, with several processes operating in the same work space concurrently.

According to a preferred embodiment, in such a situation, a patch is made from the transfer instruction in the original section of code to the newly compiled section of code. The patch modifies the transfer instruction so as to cause execution to transfer directly to the address of the newly compiled section of code. In order to allow the patch to be made, at the time of compilation the compiled code is arranged so that a patch can be inserted at a later stage, should this be required. This is done, for example, by compiling a longer form of the transfer instruction than is necessary for the original compiled code, to allow a transfer to a more distance piece of code to be made at a later stage.

A patch may also be made from the newly compiled section of code back to the original section of code, if necessary.

It should be noted that in a multi-threaded environment, patching such as that described above needs to be done atomically, that is, as a single instruction, so that other threads cannot view the area being changed in a partially changed form. Therefore, the code is arranged so that the patch can be made atomically. To retain atomicity, the patching could be done as a single write operation. Alternatively, some processors provide one or more special instructions or sequences of special instructions which ensure atomicity. In a multi-processor environment the address of the location being patched will probably, for many processors, need to be aligned according to the size of the patch data (such that the address is an integer multiple of the size of the operation).

A first example will now be described with reference to FIGS. 1A and 1B. This example concerns the case where the non-native code contained a call instruction.

Figure 1A:
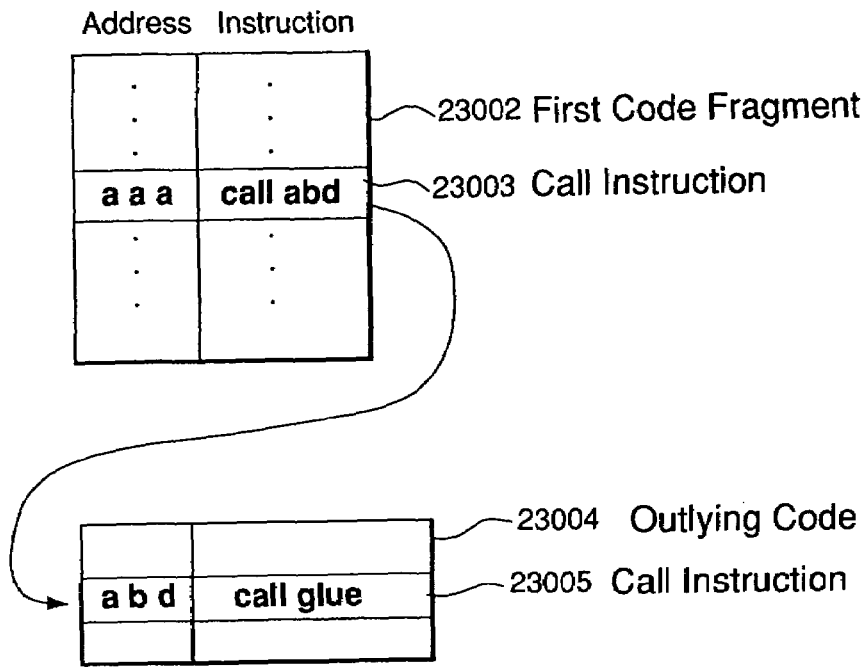
FIGS. 1A–1D illustrate the use of patches in compiled code.

Referring to FIG. 1A, a first code fragment 23002 has a call instruction 23003 at address aaa. In the original non-native code this call instruction called the subroutine 'bar'. During compilation the subroutine bar was not compiled (for example, because it was not certain which version of bar would be used), but instead a piece of outlying code 23004 was created to deal with the situation where bar is called. Call instruction 23003 points to address abd in the outlying code. At this address there is a call instruction 23005 which transfers execution to a piece of glue code. The glue code causes the subroutine bar to be interpreted, if no compiled version of bar exists. Thus, when call instruction 23003 is executed, the glue code is called.

Figure 1B:
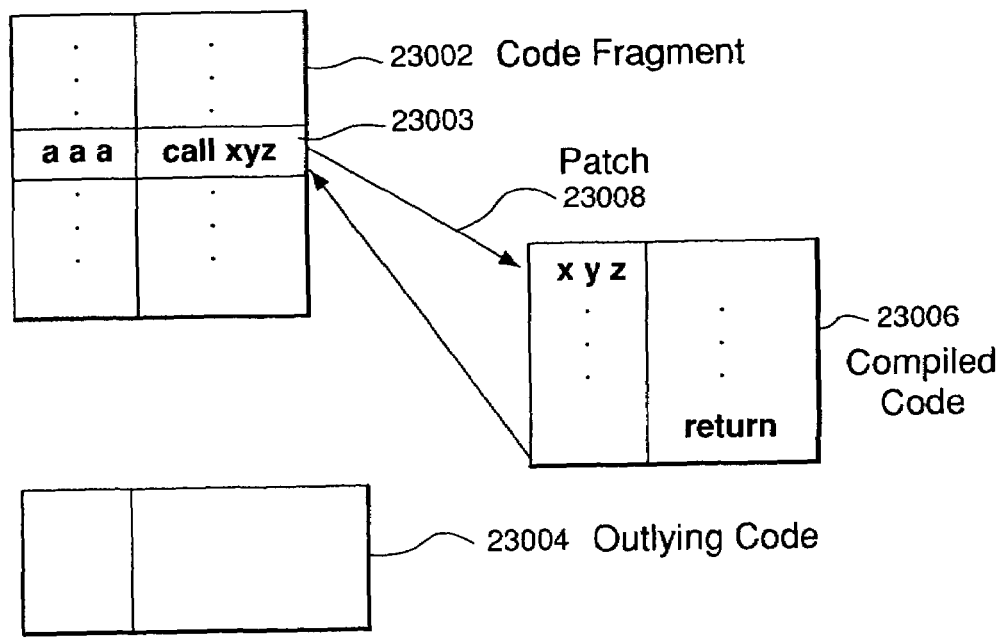

Referring now to FIG. 1B, at some later time the subroutine bar has been compiled. The compiled version of bar is stored as compiled code 23006 at address xyz, in this example. A patch 23008 is then made from code fragment 23002 to compiled code 23006, either directly or via outlying code 23004.

FIG. 1B shows the case where the patch is made directly. In this case, call instruction 23003 is changed so as to point directly to address xyz. This is possible if call instruction 23003 has been compiled in a form which is atomically patchable to address xyz.

Figure 1C:
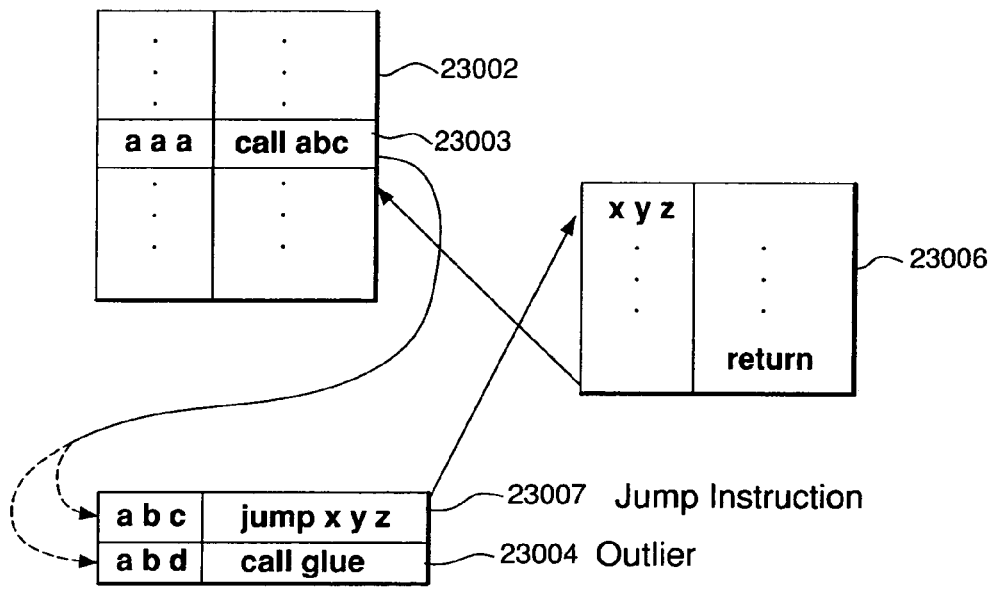

FIG. 1C shows the case where the patch is made via outlier 23004. In this case, a jump instruction 23007 at address abc in the outlier 23004 is set to jump to address xyz, and call instruction 23003 is changed to point to address abc. Alternatively, call instruction 23003 could point permanently to address abc, in which case jump instruction 23007 would point initially to address abd (to call the glue code) and would then be changed to point to address xyz (to make the patch).

In each case, the instruction that is changed to point to address xyz is in a long form to allow transfers to relatively distant addresses. Thus, when compiling the code, allowance must be made for this. For example, the call instruction 23003 could be made to be a longer version than is required if the instruction were only to point to address abd, to allow the instruction to be changed to point to a more distant address in the future. It must also be ensured that the instruction is of a type which can have the address to which it points changed atomically.

At the end of the compiled version of subroutine bar, a return instruction causes control to transfer directly back into code 23002. Once the patch has been made, execution can transfer from compiled code 23002 to compiled code 23006 and back again without the need for glue code.

For each patch, information concerning the patch is recorded in a patch block, which is stored in the code buffer (area of memory) where the patch originates from.

Figure 1D:
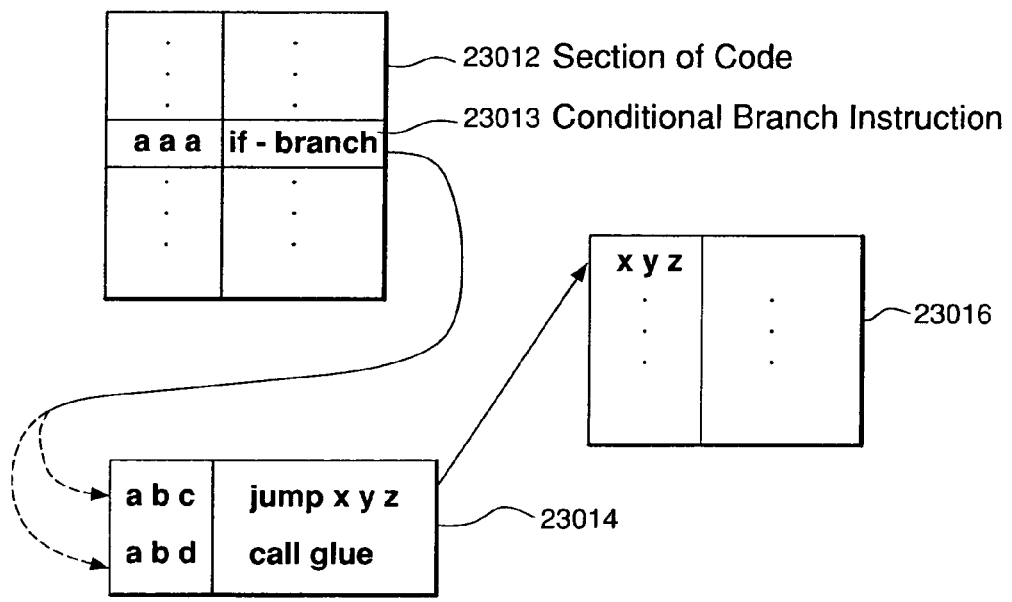

FIG. 1D illustrates an example where a section of code 23012 contains a conditional branch instruction 23013 at address aaa. During compilation, the compiler decided that the branch instruction was unlikely to be followed, and so the instructions at the address where the original (non-native) branch instruction pointed to were not compiled. In order to cope with the situation where this assumption is wrong, the compiler inserted outlier 23014. Initially, instruction 23013 points to address abd in the outlier. At this address there is a call to glue code. The glue code causes the instructions at the address where the original (non-native) branch instruction pointed to be interpreted.

At some later stage, the instructions to which the branch instruction points may be compiled, for example, because the initial assumption that these instructions are unlikely to be executed has proved to be incorrect. The compiled version of these instructions is shown at address xyz in this example. A patch may then be made directly to the compiled code at address xyz. This is done by changing a jump instruction at address abc to point to address xyz, and by changing instruction 23013 to point to address abc. Alternatively, instruction 23013 could point permanently to address abc, and the jump instruction at that address could point initially to abd, and then be changed to point to xyz. Again, at the time of compilation, the instructions which are to be changed to make the patch are set up so that the patch can be made atomically.

Thus, it will be seen that an important aspect of the above techniques is that the compiled code is arranged so that patches may be inserted at a later stage. This can be done by ensuring that, where there are two or more possible paths of execution and only one path is compiled, there exists a control transfer instruction (such as a call or jump instruction) that can be modified atomically to transfer execution to a relatively distance address.

The outliers described above may also include code for updating registers and states, before transferring control out of the compiled version of code. Such outliers are described in more detail in Appendix 2 of this specification.

In some circumstances it may be desirable or necessary to remove the patches which have been made. For example, at some stage a code buffer containing a section of compiled code may be deleted. This may be because the code buffer is required for use elsewhere, or because assumptions that were made during compilation are no longer valid. Also, it is desirable to remove any code which is not expected to be required in the future, particularly when working in a limited memory environment. If there is a patch into the code buffer, deleting the code buffer would leave a patch to a section of code that no longer exists.

At the time of deletion of a code buffer, the code buffer is examined to see if there are any patches going into or out of the buffer. Any patches going into the code buffer are redirected so as to allow execution to continue without the buffer to be deleted, for example, by redirecting the patch to a piece of glue code or outlier code. Any data structures relating to patches going out of the buffer are removed, in order to reclaim the overhead.

As mentioned above, when a patch is made, information concerning the patch is stored in a patch block. Each patch block gives the 'from' address and the 'to' address of the patch to which it relates. The patch blocks are stored as a chain in the code buffer where the patches originate. Each code buffer therefore has a chain of patch blocks relating to the patches from that buffer. The patch blocks are simultaneously chained together on a second chain, according to where the patch is to. At the same time, a hash table is maintained, which allows access to the various chains. A hash table is a data structure consisting of multiple chains of blocks, in which elements are grouped according to an arbitrary mathematical function. Hash tables are described in more detail in Appendix 7 of this specification.

In order to find the patches going into the buffer to be deleted, a hash (using the same mathematical function as the hash table) is made of the address of the buffer that the patch causes a transition to, in order to find the chain containing the patch blocks relating to 'to' patches. The patch blocks in the chain are then examined to see if they relate to patches to the buffer to be deleted. When such a patch block is found, the patch to which it relates is redirected, for example, to a piece of glue code or outlier code, and the patch block itself is removed from the chain. The glue code is designed to perform some generalised checks, and to cause the continuation of the flow of execution, for example by interpretation of subsequent instructions, or by jumping to another piece of compiled code. Further discussion of the action of the glue code can be found in Appendix 1 of this specification.

It may also be determined whether there are any patches from the buffer to be deleted. This can be done by examining the chain of patch blocks stored in the buffer to be deleted using the first chain described above. The patch blocks in this chain are examined, and if a patch which has not yet been deleted exists, the patch is deleted. In this way, the overhead associated with the patch may be reclaimed.

Figure 1E:
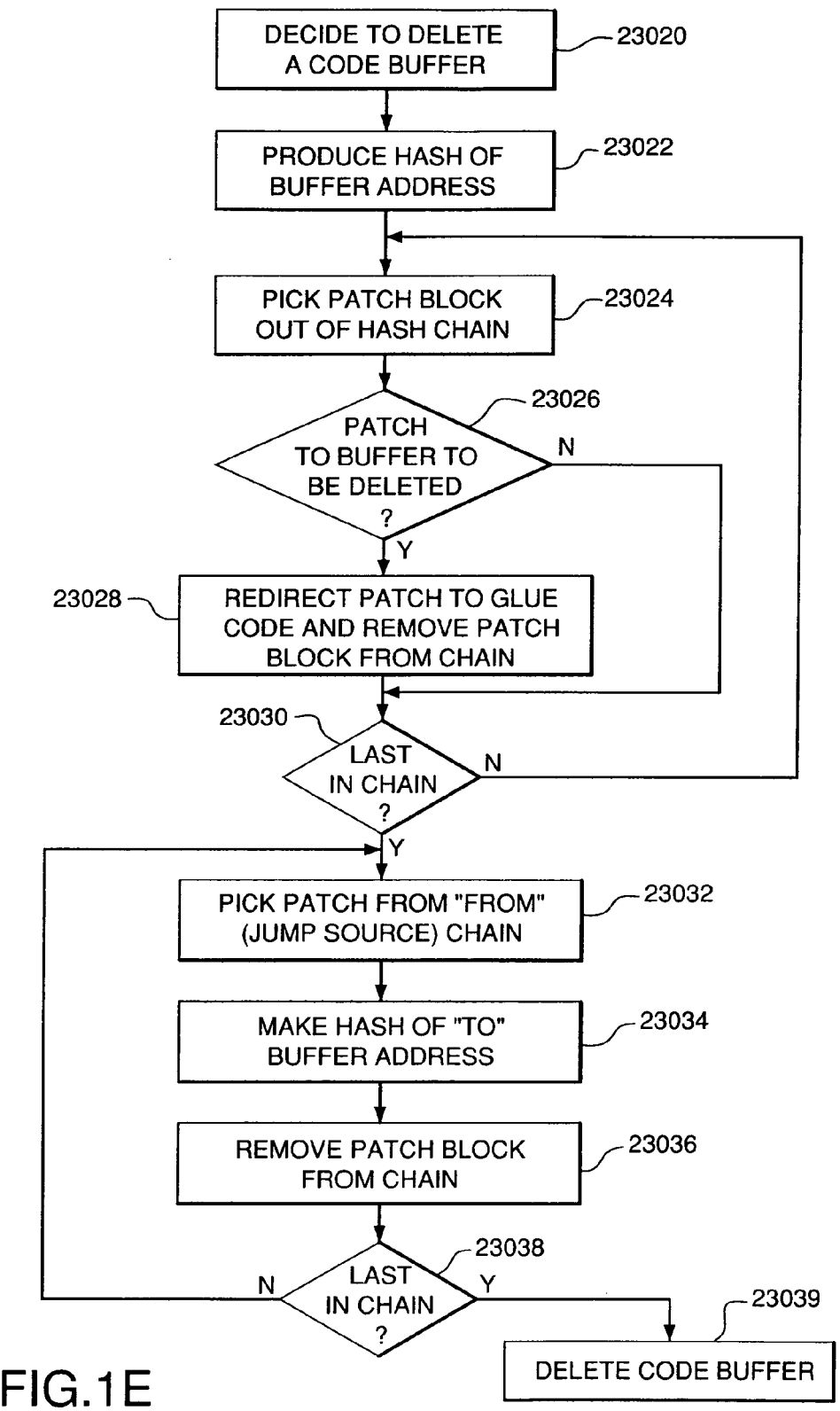
FIG. 1E is a flow diagram of a preferred method embodiment.

Referring to FIG. 1E, a method of removing patches when a code buffer is to be deleted will be described. In step 23020 it is decided that a certain code buffer is to be deleted. In step 23022 a hash is made of the address of the buffer. In step 23024 a patch block is selected from the 'to' chain in the hash table. In step 23026 it is decided, from the patch block, whether there is a patch into the buffer that is to be deleted. If there is such a patch, then in step 23028 the patch is redirected, for example, to the address of a piece of glue code, and the patch block is removed from the chain in the hash table. In step 23030 it is determined whether the patch block is the last in the chain. If not, then the sequence of selecting and testing a patch block is repeated.

Once the hash table has been examined for all patches into the code buffer, it is then examined for patches out of the code buffer. In step 23032 a patch block is selected from the 'from' (jump source) chain in the code buffer to be deleted. In step 23034 a hash is made of the 'to' buffer address. In step 23036 the patch block is removed from the hash chain relating to the "to" buffer for that patch. In step 23038 it is determined whether the patch block is the last in the 'from' chain, and if not the sequence is repeated for other patch blocks in the chain until all the patch blocks have been examined. Finally, in step 23039, the code buffer is deleted.

In another example, the patches to or from a section of compiled code are removed, not because the code buffer in which the code is stored is to be deleted, but because the compiled code is no longer to be used, for instance, because assumptions that were made during compilation are no longer valid. For example, when a potentially polymorphic method has been assumed to be final, and a patch has been made to a compiled version of that method, if it is later discovered that the method is not final, then the patch to the compiled version must be removed. Reference is made in this respect to Appendix 5 of this specification.

Figure 1F:
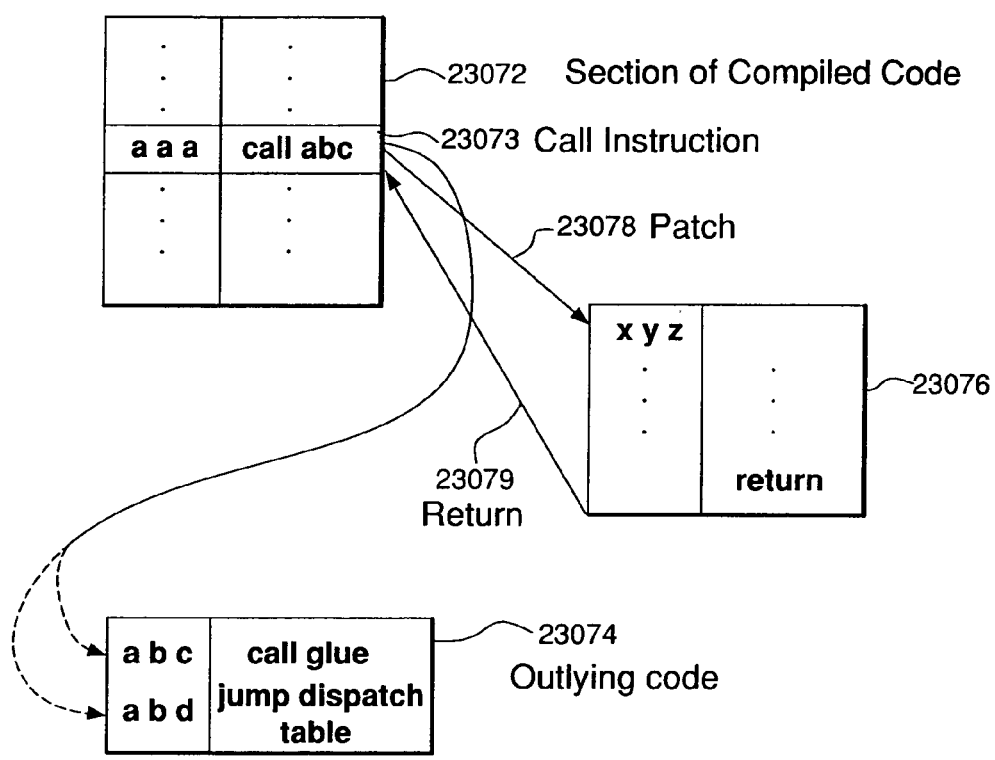
FIG. 1F illustrates the use of patches with potentially polymorphic methods.

Referring to FIG. 1F, a section of compiled code 23072 contains a call to a method, which may be polymorphic. Initially the method to be called has not been compiled. Call instruction 23073 points to address abc in a piece of outlying code 23074. At this address, there is a call to glue code. The glue code will determine which version of the method to use, and will cause that version to be executed.

Later, an assumption may be made that the method is final, and the method may be compiled. The compiled version of the method 23076 is shown at address xyz. A patch 23078 may then be made directly to the compiled version of the method. This is done by changing instruction 23073 to point directly to address xyz. Return 23079 is made back to code 23072.

Later still, the assumption that the method was final may prove to be false. In this situation, patch 23078 is removed, since it is not certain which version of the method should be used. Instruction 23073 is then changed to point to address abd. At this address there is a call to the dispatch table. The dispatch table determines which version of the method should be used, and whether there is a compiled version. If there is a compiled version, execution jumps to that version; if not, execution jumps to glue code which causes the method to be interpreted.

The technique for deleting compiled code may be used in combination with the 'Stack Walking' technique described in Appendix 3 of this specification, and/or with any other techniques described herein.

Figure 1G:
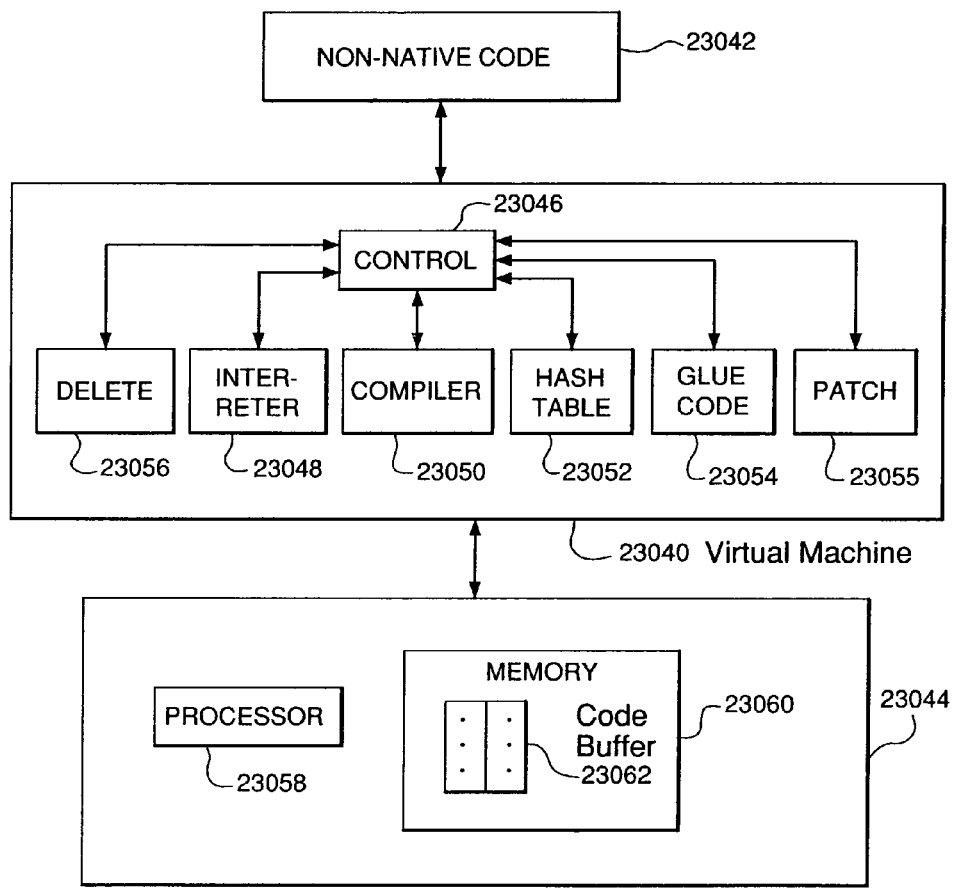
FIG. 1G is a block diagram of a preferred apparatus embodiment.

Referring to FIG. 1G, an apparatus for putting the present embodiment into effect will be described. FIG. 1G shows a computer system including a virtual machine 23040 which allows non-native code 23042 to run on host computer 23044. The virtual machine includes control means 23046, interpreter 23048, compiler 23050, glue code 23054, and deletion means 23056. The host computer includes a processor 23058 and memory 23060 including code buffer 23062. Code buffer 23062 contains code which has been compiled by the compiler. The compiler is adapted to compile code in any of the ways described above. Also shown in FIG. 1G is patching means 23055 for inserting a patch from one piece of compiled code to another. The patching means 23055 is adapted to make a patch in any of the ways described above.

In operation, the control means 23046 may decide at a certain time that code buffer 23062 is to be deleted. It then consults a hash table 23052 to identify any patches going into or out of the code buffer in the way described above. If any patches are found going into the code buffer, the control means redirects those patches, for example, to glue code 23054. If any patches are found going out of the code buffer, the control means removes the patch blocks relating to those patches. The control means then instructs the deletion means 23056 to delete the code buffer.

It will be appreciated that the virtual machine shown in FIG. 1G will generally be in the form of software and stored in the memory of the host computer 23044.

It will be understood that the present invention has been described above purely by way of example, and modifications of detail can be made within the scope of the invention.

Each feature disclosed in the description, and (where appropriate) the claims and drawings may be provided independently or in any appropriate combination.

In any or all of the aforementioned, certain features of the present invention have been implemented using computer software. However, it will of course be clear to the skilled man that any of these features may be implemented using hardware or a combination of hardware and software. Furthermore, it will be readily understood that the functions performed by the hardware, the computer software, and such like, are performed on or using electrical and like signals.

Features that relate to the storage of information may be implemented by suitable memory locations or stores. Features which relate to the processing of information may be implemented by a suitable processor or control means, either in software or in hardware or in a combination of the two.

In any or all of the aforementioned, the invention may be embodied in any, some, or all of the following forms: it may be embodied in a method of operating a computer system; it may be embodied in the computer system itself; it may be embodied in a computer system when programmed with or adapted or arranged to execute the method of operating that system; and/or it may be embodied in a computer-readable storage medium having a program recorded thereon which is adapted to operate according to the method of operating the system.

As used herein throughout the term 'computer system' may be interchanged for 'computer,' 'system,' 'equipment,' 'apparatus,' 'machine,' and like terms. The computer system may be or may include a virtual machine.

In any or all of the aforementioned, different features and aspects described above, including method and apparatus features and aspects, may be combined in any appropriate fashion.

It will be understood that the present invention(s) has been described above purely by way of example, and modifications of detail can be made within the scope of the invention.

Each feature disclosed in the description, and (where appropriate) the claims and drawings may be provided independently or in any appropriate combination.

Some of the terms used above are specific to the Java language and to Java-type languages. Various aspects of the inventions and their embodiments are also applicable in the use of other languages. It will be understood that the terms used herein should be construed broadly, unless clear to the contrary, to include similar and/or corresponding features relating to other languages.

Features of one aspect of any one of the inventions may be applied to other aspects of the invention or other inventions described herein. Similarly, method features may be applied to the apparatus and vice versa.

What is claimed is:

1. A method of providing a link between pieces of compiled code in a self-modifying multi-threaded computer system having system memory and a system compiler for compiling a program during execution of a program, the method comprising the steps of:
   (a) first determining whether a first piece of code includes a dominant path therethrough formed of a series of program instructions for execution one after another in sequence during execution of the dominant path;
   (b) first determining whether the first piece of code includes a control transfer instruction therein;
   (c) first compiling the first piece of code by the system compiler during execution of the program to provide a first piece of compiled code only if the first piece of code is determined to be a dominant path and the control transfer instruction is determined to be present in the first piece of code;
   (d) second compiling a second piece of code by the system compiler during execution of the program to provide a second piece of compiled code; and
   (e) creating a link between the first and second pieces of compiled code by changing the control transfer instruction within of the first piece of compiled code, whereby the link is disposed in the first piece of compiled code for linking the first piece of compiled code to the second piece of compiled code.

2. A method as claimed in claim 1, wherein creating a link between the first piece of compiled code and the second piece of compiled code includes making a reference to an outlier by changing the control transfer instruction within the first piece of compiled code.

3. A method as claimed in claim 1, further comprising recording information about the link in a buffer.

4. A method as claimed in claim 1, further comprising maintaining a hash table.

5. A method as claimed in claim 1, wherein creating a link between the first piece of compiled code and the second piece of compiled code by changing the control transfer instruction within the first piece of compiled code includes making a change to an instruction atomically.

6. A method as claimed in claim 1, further comprising removing the link when a predetermined condition occurs.

7. A method as claimed in claim 6, wherein the predetermined condition is that assumptions made during compilation are no longer valid.

8. A method as claimed in claim 6, wherein the predetermined condition is that a code buffer holding the second piece of compiled code is required for use elsewhere in the computer system.

9. A method as claimed in claim 6, wherein the predetermined condition is that the second piece of compiled code is no longer required by the computer system.

10. A method as claimed in claim 6, wherein removing the link includes identifying any links between the first and second pieces of compiled code.

11. A method as claimed in claim 6, further comprising redirecting any identified links to glue code.

* * * * *